(12) United States Patent
Matas et al.

(10) Patent No.: US 9,606,708 B2
(45) Date of Patent: Mar. 28, 2017

(54) USER INTENT DURING OBJECT SCROLLING

(75) Inventors: Michael Matas, San Francisco, CA (US); Kimon Tsinteris, San Francisco, CA (US); Austin Sarner, San Francisco, CA (US); Charles Melcher, New York, NY (US)

(73) Assignee: Facebook, Inc., Menlo Park, CA (US)

( * ) Notice: Subject to any disclaimer, the term of this patent is extended or adjusted under 35 U.S.C. 154(b) by 206 days.

(21) Appl. No.: 13/555,876

(22) Filed: Jul. 23, 2012

(65) Prior Publication Data

US 2013/0198682 A1    Aug. 1, 2013

Related U.S. Application Data

(60) Provisional application No. 61/593,841, filed on Feb. 1, 2012.

(51) Int. Cl.

| G06F 3/0485 | (2013.01) |
| G06F 17/30 | (2006.01) |
| G06F 3/0484 | (2013.01) |
| G06T 15/60 | (2006.01) |
| G06T 11/60 | (2006.01) |
| G06F 3/0481 | (2013.01) |
| G06F 3/01 | (2006.01) |

(Continued)

(52) U.S. Cl.
CPC .......... *G06F 3/04847* (2013.01); *G06F 3/017* (2013.01); *G06F 3/0481* (2013.01); *G06F 3/0484* (2013.01); *G06F 3/0485* (2013.01); *G06F 3/04815* (2013.01); *G06F 3/04842* (2013.01); *G06F 17/211* (2013.01); *G06F 17/2241* (2013.01); *G06T 11/60* (2013.01); *G06T 15/60* (2013.01); *H04L 67/06* (2013.01); *H04L 67/18* (2013.01)

(58) Field of Classification Search
None
See application file for complete search history.

(56) References Cited

U.S. PATENT DOCUMENTS

| 5,727,129 A | 3/1998 | Barrett |
| 6,421,071 B1 | 7/2002 | Harrison |

(Continued)

OTHER PUBLICATIONS

U.S. Appl. No. 13/487,765, filed Jun. 4, 2012, Matas.

(Continued)

*Primary Examiner* — Maryam Ipakchi
(74) *Attorney, Agent, or Firm* — Baker Botts L.L.P.

(57) ABSTRACT

Particular embodiments arrange a plurality of objects in a hierarchy, the hierarchy having one or more layers and each layer having at least one of the objects; display a portion of a sequence of first objects on a screen of a user device, the sequence of first objects all belong to a first layer in the hierarchy, each first object having as its children one or more second objects belonging to a second layer immediately below the first layer in the hierarchy; in response to a user scrolling through the sequence of first objects, estimate which specific first object in the sequence the user is likely to be viewing at a predetermined time in the future based on an acceleration of the user scrolling through the sequence of first objects; and preload the second objects that are children of the specific first object.

20 Claims, 20 Drawing Sheets

(51) Int. Cl.
 *G06F 17/21* (2006.01)
 *G06F 17/22* (2006.01)
 *H04L 29/08* (2006.01)

(56) References Cited

U.S. PATENT DOCUMENTS

| | | |
|---|---|---|
| 6,934,740 B1 | 8/2005 | Lawande |
| 6,948,125 B2 * | 9/2005 | Detweiler et al. ............. 715/713 |
| 6,971,957 B2 | 12/2005 | Osako |
| 7,320,113 B2 | 1/2008 | Roberts |
| 7,434,245 B1 | 10/2008 | Shiga |
| 7,439,975 B2 | 10/2008 | Hsu |
| 7,663,620 B2 | 2/2010 | Robertson |
| 7,663,623 B2 | 2/2010 | Zhou |
| 7,667,719 B2 * | 2/2010 | Goodwin et al. ............. 345/684 |
| 7,675,518 B1 | 3/2010 | Miller |
| 7,743,322 B2 | 6/2010 | Atkins |
| 7,769,794 B2 | 8/2010 | Moore |
| 7,817,823 B1 | 10/2010 | O'Donnell |
| 7,916,157 B1 | 3/2011 | Kelley |
| 7,996,788 B2 | 8/2011 | Carmichael |
| 8,006,195 B1 | 8/2011 | Woodings |
| 8,082,522 B2 * | 12/2011 | Kinouchi ...................... 715/830 |
| 8,131,898 B2 | 3/2012 | Shah |
| 8,140,404 B1 * | 3/2012 | Scott et al. .................. 705/26.1 |
| 8,341,543 B2 * | 12/2012 | Shah ............................. 715/784 |
| 8,365,091 B2 | 1/2013 | Young |
| 8,416,198 B2 * | 4/2013 | Rathnam et al. ............. 345/173 |
| 8,438,504 B2 | 5/2013 | Cranfill |
| 8,458,614 B1 | 6/2013 | Smith |
| 8,473,868 B1 | 6/2013 | Kauffman |
| 8,516,385 B1 | 8/2013 | Eismann |
| 8,533,190 B2 | 9/2013 | Walker |
| 8,539,344 B2 | 9/2013 | Hull |
| 8,539,384 B2 | 9/2013 | Hinckley |
| 8,584,027 B2 | 11/2013 | Quennesson |
| 8,635,531 B2 | 1/2014 | Graham |
| 8,639,694 B1 * | 1/2014 | Wolfe ........................... 707/736 |
| 8,656,312 B2 * | 2/2014 | Kagaya et al. ............... 715/854 |
| 8,669,950 B2 | 3/2014 | Forstall |
| 8,683,378 B2 * | 3/2014 | Bull et al. .................... 715/786 |
| 8,736,561 B2 | 5/2014 | Anzures |
| 8,799,658 B1 | 8/2014 | Seller |
| 8,826,141 B2 * | 9/2014 | Dimitrov ............... G06F 3/0481 |
| | | 705/14.55 |
| 8,856,678 B1 | 10/2014 | Cho |
| 8,856,684 B2 | 10/2014 | Duhig |
| 8,904,304 B2 | 12/2014 | Farago |
| 8,930,992 B2 | 1/2015 | Sugiyama |
| 8,977,980 B2 | 3/2015 | Abe |
| 9,009,626 B2 * | 4/2015 | Tsuk et al. ................... 715/830 |
| 2001/0030667 A1 * | 10/2001 | Kelts ............................. 345/854 |
| 2001/0033303 A1 * | 10/2001 | Anderson ..................... 345/854 |
| 2002/0029232 A1 | 3/2002 | Bobrow |
| 2002/0070982 A1 | 6/2002 | Hill |
| 2002/0107892 A1 | 8/2002 | Chittu |
| 2003/0046401 A1 | 3/2003 | Abbott |
| 2003/0051214 A1 | 3/2003 | Graham |
| 2003/0090504 A1 | 5/2003 | Brook |
| 2004/0001106 A1 | 1/2004 | Deutscher |
| 2004/0095376 A1 | 5/2004 | Graham |
| 2004/0145603 A1 | 7/2004 | Soares |
| 2005/0005246 A1 | 1/2005 | Card |
| 2005/0010955 A1 | 1/2005 | Elia |
| 2005/0055426 A1 | 3/2005 | Smith |
| 2005/0071783 A1 | 3/2005 | Atkins |
| 2005/0210403 A1 | 9/2005 | Satanek |
| 2005/0262149 A1 | 11/2005 | Jung |
| 2006/0017735 A1 | 1/2006 | Rabb |
| 2006/0036625 A1 | 2/2006 | Judd |
| 2006/0059425 A1 | 3/2006 | Anspach |
| 2006/0174209 A1 * | 8/2006 | Barros ........................... 715/764 |
| 2006/0230354 A1 | 10/2006 | Jennings |
| 2006/0236251 A1 | 10/2006 | Kataoka |
| 2006/0253777 A1 | 11/2006 | Yalovsky |
| 2007/0073719 A1 * | 3/2007 | Ramer .................. G06F 3/0346 |
| 2007/0088681 A1 * | 4/2007 | Aravamudan ....... G06F 17/3056 |
| 2007/0115300 A1 | 5/2007 | Barney |
| 2007/0150826 A1 | 6/2007 | Anzures |
| 2007/0226640 A1 | 9/2007 | Holbrook |
| 2007/0258642 A1 | 11/2007 | Thota |
| 2007/0271516 A1 | 11/2007 | Carmichael |
| 2008/0022229 A1 * | 1/2008 | Bhumkar .......... G06F 17/30991 |
| | | 715/838 |
| 2008/0052636 A1 | 2/2008 | Abe |
| 2008/0052742 A1 | 2/2008 | Kopf |
| 2008/0065675 A1 * | 3/2008 | Bozich et al. ................ 707/102 |
| 2008/0079972 A1 | 4/2008 | Goodwin |
| 2008/0082927 A1 | 4/2008 | Kelts |
| 2008/0092111 A1 | 4/2008 | Kinnucan |
| 2008/0098330 A1 * | 4/2008 | Tsuk ....................... G06F 1/1626 |
| | | 715/830 |
| 2008/0155458 A1 * | 6/2008 | Fagans ................ G06F 3/04817 |
| | | 715/781 |
| 2008/0168404 A1 | 7/2008 | Ording |
| 2008/0174570 A1 | 7/2008 | Jobs |
| 2008/0222540 A1 | 9/2008 | Schulz |
| 2008/0276273 A1 | 11/2008 | Billmaier |
| 2009/0007017 A1 | 1/2009 | Anzures |
| 2009/0007188 A1 * | 1/2009 | Omernick .......... H04N 21/2402 |
| | | 725/62 |
| 2009/0061837 A1 | 3/2009 | Chaudhri |
| 2009/0070710 A1 | 3/2009 | Kagaya |
| 2009/0100373 A1 * | 4/2009 | Pixley ................. G06F 3/03543 |
| | | 715/786 |
| 2009/0132921 A1 | 5/2009 | Hwangbo |
| 2009/0172532 A1 | 7/2009 | Chaudhri |
| 2009/0172543 A1 | 7/2009 | Cronin |
| 2009/0201270 A1 | 8/2009 | Pikkujamsa |
| 2009/0204928 A1 | 8/2009 | Kallio |
| 2009/0228782 A1 | 9/2009 | Fraser |
| 2009/0228832 A1 | 9/2009 | Cheng |
| 2009/0249238 A1 | 10/2009 | Chudy |
| 2009/0271703 A1 | 10/2009 | Chu |
| 2009/0288032 A1 | 11/2009 | Chang |
| 2009/0300548 A1 | 12/2009 | Sullivan |
| 2009/0309846 A1 | 12/2009 | Trachtenberg |
| 2010/0060666 A1 | 3/2010 | Fong |
| 2010/0097338 A1 | 4/2010 | Miyashita |
| 2010/0114991 A1 | 5/2010 | Chaudhary |
| 2010/0122195 A1 | 5/2010 | Hwang |
| 2010/0174993 A1 | 7/2010 | Pennington |
| 2010/0199180 A1 | 8/2010 | Brichter |
| 2010/0277496 A1 | 11/2010 | Kawanishi |
| 2010/0287494 A1 | 11/2010 | Ording |
| 2010/0313125 A1 * | 12/2010 | Fleizach et al. ............... 715/702 |
| 2011/0035703 A1 | 2/2011 | Negishi |
| 2011/0063248 A1 | 3/2011 | Yoon |
| 2011/0074699 A1 * | 3/2011 | Marr ..................... G06F 3/0485 |
| | | 345/173 |
| 2011/0122078 A1 | 5/2011 | Kasahara |
| 2011/0157051 A1 | 6/2011 | Shohga |
| 2011/0163969 A1 * | 7/2011 | Anzures et al. ............... 345/173 |
| 2011/0163971 A1 | 7/2011 | Wagner |
| 2011/0167380 A1 | 7/2011 | Stallings |
| 2011/0187655 A1 | 8/2011 | Min |
| 2011/0202834 A1 | 8/2011 | Mandryk |
| 2011/0202847 A1 * | 8/2011 | Dimitrov ............... G06F 3/0481 |
| | | 715/738 |
| 2011/0209100 A1 | 8/2011 | Hinckley |
| 2011/0234615 A1 | 9/2011 | Hanson |
| 2011/0246614 A1 | 10/2011 | Votaw |
| 2011/0276863 A1 | 11/2011 | Bhise |
| 2011/0296344 A1 | 12/2011 | Habib |
| 2011/0302532 A1 | 12/2011 | Missig |
| 2012/0005623 A1 | 1/2012 | Ishak |
| 2012/0047432 A1 | 2/2012 | Yalovsky |
| 2012/0054684 A1 | 3/2012 | Gossweiler |
| 2012/0070017 A1 | 3/2012 | Dorogusker |
| 2012/0084662 A1 | 4/2012 | Navarro |
| 2012/0131516 A1 | 5/2012 | Chiu |
| 2012/0148088 A1 | 6/2012 | Mital |
| 2012/0159393 A1 * | 6/2012 | Sethi ............................. 715/830 |
| 2012/0192101 A1 | 7/2012 | Migos |

(56) References Cited

U.S. PATENT DOCUMENTS

| | | |
|---|---|---|
| 2012/0192118 A1 | 7/2012 | Migos |
| 2012/0227002 A1 | 9/2012 | Tiwarie |
| 2012/0233573 A1 | 9/2012 | Sullivan |
| 2012/0266068 A1* | 10/2012 | Ryman et al. ............... 715/719 |
| 2012/0266104 A1 | 10/2012 | Shah |
| 2012/0272171 A1 | 10/2012 | Icho |
| 2012/0272181 A1 | 10/2012 | Rogers |
| 2012/0311438 A1 | 12/2012 | Cranfill |
| 2012/0327009 A1 | 12/2012 | Fleizach |
| 2013/0019263 A1 | 1/2013 | Ferren |
| 2013/0073932 A1 | 3/2013 | Migos |
| 2013/0104017 A1 | 4/2013 | Ko |
| 2013/0135309 A1 | 5/2013 | King |
| 2013/0183943 A1 | 7/2013 | Tow |
| 2013/0194269 A1 | 8/2013 | Matas |
| 2013/0194307 A1 | 8/2013 | Matas |
| 2013/0198261 A1 | 8/2013 | Matas |
| 2013/0198631 A1 | 8/2013 | Matas |
| 2013/0198634 A1 | 8/2013 | Matas |
| 2013/0198661 A1 | 8/2013 | Matas |
| 2013/0198663 A1 | 8/2013 | Matas |
| 2013/0198664 A1 | 8/2013 | Matas |
| 2013/0198665 A1 | 8/2013 | Matas |
| 2013/0198666 A1 | 8/2013 | Matas |
| 2013/0198668 A1 | 8/2013 | Matas |
| 2013/0198681 A1 | 8/2013 | Matas |
| 2013/0198683 A1 | 8/2013 | Matas |
| 2013/0205210 A1 | 8/2013 | Jeon |
| 2013/0227494 A1 | 8/2013 | Matas |
| 2013/0314341 A1 | 11/2013 | Lee |
| 2013/0339907 A1 | 12/2013 | Matas |
| 2013/0346906 A1 | 12/2013 | Farago |
| 2014/0013283 A1 | 1/2014 | Matas |
| 2014/0033124 A1 | 1/2014 | Sorrick |
| 2014/0046809 A1 | 2/2014 | Baker |
| 2014/0164985 A1* | 6/2014 | Pimmel ............ G06F 17/30867 715/784 |
| 2014/0250358 A1* | 9/2014 | Milener et al. ............... 715/207 |
| 2014/0258849 A1 | 9/2014 | Chung |
| 2014/0282262 A1* | 9/2014 | Gregotski et al. ............ 715/838 |
| 2014/0282263 A1 | 9/2014 | Pennington |
| 2014/0288686 A1 | 9/2014 | Sant |
| 2015/0026825 A1 | 1/2015 | Dube |
| 2015/0100880 A1 | 4/2015 | Matas |
| 2015/0100924 A1 | 4/2015 | Matas |

OTHER PUBLICATIONS

U.S. Appl. No. 13/487,805, filed Jun. 4, 2012, Matas.
U.S. Appl. No. 13/555,607, filed Jul. 23, 2012, Matas.
U.S. Appl. No. 13/555,657, filed Jul. 23, 2012, Matas.
U.S. Appl. No. 13/555,845, filed Jul. 23, 2012, Matas.
U.S. Appl. No. 13/488,039, filed Jun. 2, 2012, Matas.
U.S. Appl. No. 13/490,343, filed Jun. 6, 2012, Matas.
U.S. Appl. No. 13/488,076, filed Jun. 4, 2012, Matas.
U.S. Appl. No. 13/555,909, filed Jul. 23, 2012, Matas.
U.S. Appl. No. 13/490,367, filed Jun. 6, 2012, Matas.
U.S. Appl. No. 13/490,736, filed Jun. 7, 2012, Matas.
U.S. Appl. No. 13/489,172, filed Jun. 5, 2012, Matas.
U.S. Appl. No. 13/491,100, filed Jun. 7, 2012, Matas.
U.S. Appl. No. 13/489,265, filed Jun. 5, 2012, Matas.
Response to Final Office Action for U.S. Appl. No. 13/487,765, Dec. 29, 2014.
Final Office Action for U.S. Appl. No. 13/487,765, Oct. 3, 2014.
Response to Non-Final Office Action for U.S. Appl. No. 13/487,765, Aug. 13, 2014.
Non-Final Office Action for U.S. Appl. No. 13/487,765, Mar. 14, 2014.
Response to Final Office Action for U.S. Appl. No. 13/487,805, Dec. 29, 2014.
Final Office Action for U.S. Appl. No. 13/487,805, Sep. 26, 2014.
Response to Non-Final Office Action for U.S. Appl. No. 13/487,805, Jul. 31, 2014.
Non-Final Office Action for U.S. Appl. No. 13/487,805, Apr. 3, 2014.
Final Office Action for U.S. Appl. No. 13/555,607, Dec. 3, 2014.
Response to Non-Final Office Action for U.S. Appl. No. 13/555,607, Nov. 4, 2014.
Non-Final Office Action for U.S. Appl. No. 13/555,607, Aug. 20, 2014.
Amendment under Rule 312 for U.S. Appl. No. 13/555,657, Dec. 30, 2014.
Notice of Allowance for U.S. Appl. No. 13/555,657, Dec. 5, 2014.
Response to Non-Final Office Action for U.S. Appl. No. 13/555,657, Nov. 19, 2014.
Non-Final Office Action for U.S. Appl. No. 13/555,657, Sep. 18, 2014.
Response to Non-Final Office Action for U.S. Appl. No. 13/555,845, Oct. 24, 2014.
Non-Final Office Action for U.S. Appl. No. 13/555,845, Apr. 24, 2014.
Final Office Action for U.S. Appl. No. 13/488,039, Dec. 12, 2014.
Response to Non-Final Office Action for U.S. Appl. No. 13/488,039, Nov. 7, 2014.
Non-Final Office Action for U.S. Appl. No. 13/488,039, Jun. 11, 2014.
Response to Final Office Action for U.S. Appl. No. 13/490,343, Dec. 19, 2014.
Final Office Action for U.S. Appl. No. 13/490,343, Nov. 7, 2014.
Response to Non-Final Office Action for U.S. Appl. No. 13/490,343, Oct. 22, 2014.
Non-Final Office Action for U.S. Appl. No. 13/490,343, Jun. 4, 2014.
Response to Final Office Action for U.S. Appl. No. 13/488,076, Dec. 29, 2014.
Final Office Action for U.S. Appl. No. 13/488,076, Oct. 3, 2014.
Response to Non-Final Office Action for U.S. Appl. No. 13/488,076, Jul. 31, 2014.
Non-Final Office Action for U.S. Appl. No. 13/488,076, Apr. 1, 2014.
Non-Final Office Action for U.S. Appl. No. 13/555,909, Nov. 14, 2014.
Response to Final Office Action for U.S. Appl. No. 13/555,909, Aug. 8, 2014.
Final Office Action for U.S. Appl. No. 13/555,909, Apr. 28, 2014.
Response to Non-Final Office Action for U.S. Appl. No. 13/555,909, Mar. 27, 2014.
Non-Final Office Action for U.S. Appl. No. 13/555,909, Jan. 2, 2014.
Non-Final Office Action for U.S. Appl. No. 13/490,367, Nov. 20, 2014.
Response to Final Office Action for U.S. Appl. No. 13/490,367, Sep. 19, 2014.
Final Office Action for U.S. Appl. No. 13/490,367, May 1, 2014.
Response to Non-Final Office Action for U.S. Appl. No. 13/490,367, Apr. 4, 2014.
Non-Final Office Action for U.S. Appl. No. 13/490,367, Jan. 3, 2014.
Notice of Allowance for U.S. Appl. No. 13/490,736, Nov. 21, 2014.
Response to Non-Final Office Action for U.S. Appl. No. 13/490,736, Oct. 23, 2014.
Non-Final Office Action for U.S. Appl. No. 13/490,736, Jul. 8, 2014.
Final Office Action for U.S. Appl. No. 13/489,172, Dec. 12, 2014.
Response to Non-Final Office Action for U.S. Appl. No. 13/489,172, Aug. 12, 2014.
Non-Final Office Action for U.S. Appl. No. 13/489,172, Mar. 28, 2014.
Response to Non-Final Office Action for U.S. Appl. No. 13/491,100, Oct. 30, 2014.
Non-Final Office Action for U.S. Appl. No. 13/491,100, Jul. 31, 2014.
Notice of Allowance for U.S. Appl. No. 13/489,265, Nov. 7, 2014.
Response to Non-Final Office Action for U.S. Appl. No. 13/489,265, Oct. 28, 2014.

(56) References Cited

OTHER PUBLICATIONS

Non-Final Office Action for U.S. Appl. No. 13/489,265, May 2, 2014.
Response to Non-Final Office Action for U.S. Appl. No. 13/677,132, Jan. 5, 2015.
Non-Final Office Action for U.S. Appl. No. 13/677,132, Oct. 3, 2014.
Non-Final Office Action for U.S. Appl. No. 13/677,093, Nov. 21, 2014.
Final Office Action for U.S. Appl. No. 13/487,765, Jan. 14, 2015.
Final Office Action for U.S. Appl. No. 13/487,805, Jun. 1, 2015.
Response to Non-Final Office Action for U.S. Appl. No. 13/487,805, May 18, 2015.
Non-Final Office Action for U.S. Appl. No. 13/487,805, Jan. 16, 2015.
Notice of Allowance for U.S. Appl. No. 13/555,607, Mar. 4, 2015.
Response to Final Office Action for U.S. Appl. No. 13/555,607, Feb. 12, 2015.
Notice of Allowance for U.S. Appl. No. 13/555,657, Feb. 11, 2015.
Notice of Allowance for U.S. Appl. No. 13/555,845, Jan. 30, 2015.
Notice of Allowance for U.S. Appl. No. 13/555,845, Dec. 19, 2014.
Non-Final Office Action for U.S. Appl. No. 13/488,039, Apr. 24, 2015.
Response to Final Office Action for U.S. Appl. No. 13/488,039, Mar. 17, 2015.
Notice of Allowance for U.S. Appl. No. 13/490,343, Jan. 29, 2015.
Notice of Allowance for U.S. Appl. No. 13/490,343, Jan. 14, 2015.
Non-Final Office Action for U.S. Appl. No. 13/488,076, Jan. 15, 2015.
Response to Non-Final Office Action for U.S. Appl. No. 13/555,909, Mar. 4, 2015.
Final Office Action for U.S. Appl. No. 13/490,367, May 21, 2015.
Response to Non-Final Office Action for U.S. Appl. No. 13/490,367, Mar. 19, 2015.
Notice of Allowance for U.S. Appl. No. 13/490,736, Feb. 25, 2015.
Response to Final Office Action for U.S. Appl. No. 13/489,172, Feb. 12, 2015.
Non-Final Office Action for U.S. Appl. No. 13/491,100, May 29, 2015.
Response to Final Office Action for U.S. Appl. No. 13/491,100, May 18, 2015.
Final Office Action for U.S. Appl. No. 13/491,100, Feb. 27, 2015.
Notice of Allowance for U.S. Appl. No. 13/489,265, Jan. 30, 2015.
Final Office Action for U.S. Appl. No. 13/677,093, May 28, 2015.
Response to Non-Final Office Action for U.S. Appl. No. 13/677,093, Mar. 19, 2015.
Final Office Action for U.S. Appl. No. 13/677,132, Apr. 7, 2015.
Borst, C. et al., "A Spring Model for Whole-Hand Virtual Grasping," Presence, vol. 15, No. 1, pp. 47, 61, Feb. 2006, doi: 10.1162/pres.2006.15.1.47, http://ieeexplore.ieee.org/stamp/stamp.jsp?tp=&arnumber=6797721&isnumber=6797198, Jun. 3, 2015.

\* cited by examiner

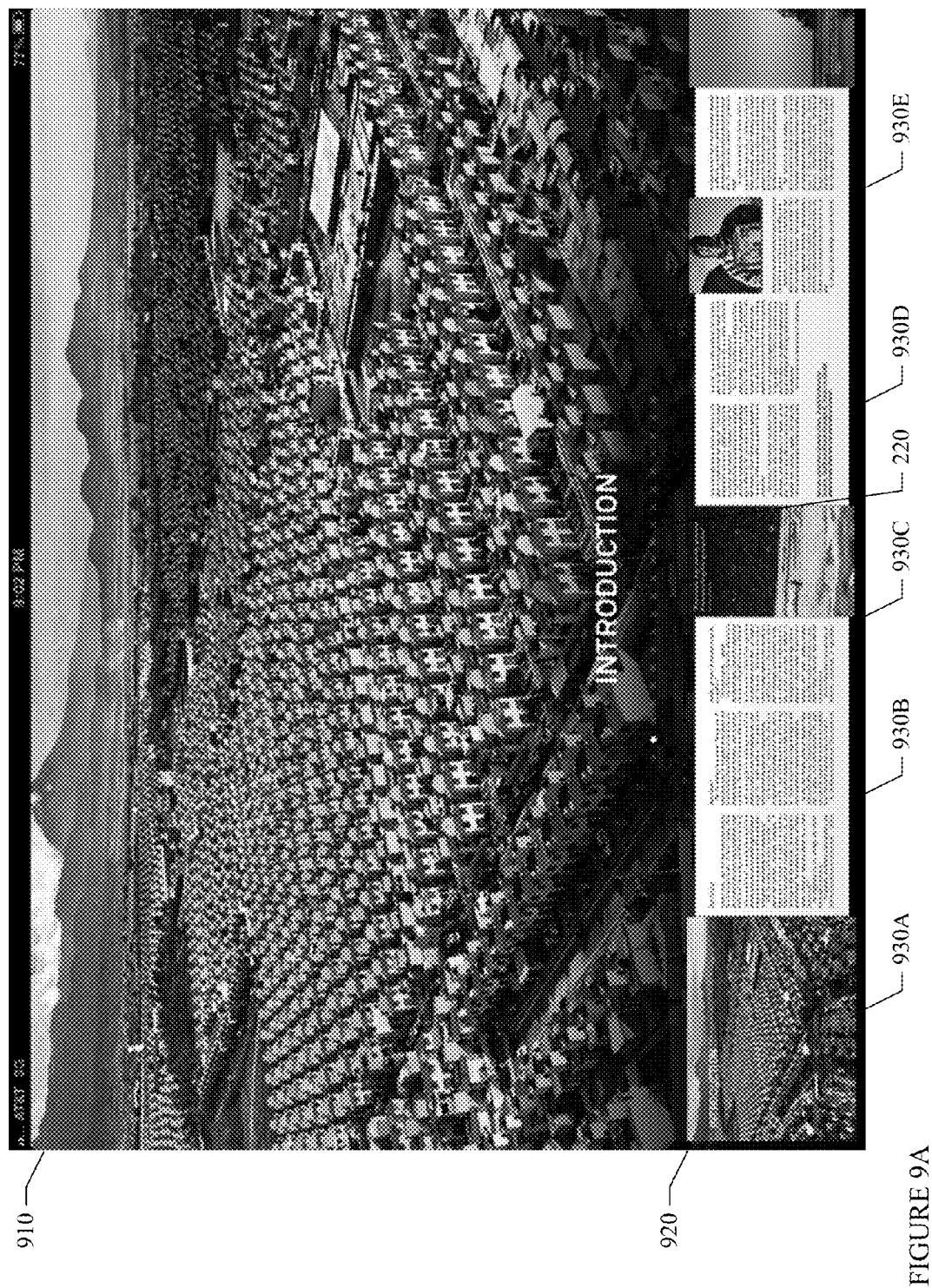

USER INTENT DURING OBJECT SCROLLING

RELATED APPLICATION

This application claims the benefit, under 35 U.S.C. §119(e), of U.S. Provisional Patent Application No. 61/593,841, filed on 1 Feb. 2012, which is incorporated herein by reference in its entirety and for all purposes.

TECHNICAL FIELD

This disclosure generally relates to presenting multimedia objects, such as images or videos, in a user interface.

BACKGROUND

A user interface (UI), in the industrial design field of human-machine interaction, is the space where interactions between humans and machines occur. The goal of interactions between a human, often referred to as a "user", and a machine at the user interface is user's control of the machine and its operations (e.g., through user input) and machine feedback (e.g., through program output). A graphical user interface (GUI) is a type of user interface that allows users to interact with software applications executing on electronic or computing devices through multimedia objects (e.g., images, videos, audios, etc.) rather than purely text commands.

BRIEF DESCRIPTION OF THE DRAWINGS

FIGS. 9A-9C illustrate an example of scrolling through objects in a hierarchy.

DESCRIPTION OF EXAMPLE EMBODIMENTS

In particular embodiments, a user interface (UI), and more specifically, a graphical user interface (GUI) may include any number of UI components or elements arranged in a hierarchy. The components of a user interface may be presented to users according to the hierarchical structure. In particular embodiments, some of these UI components may correspond to or represent multimedia objects, such as images, videos, or audios. Sometimes, these multimedia UI components may be presented to users individually on their own. Other times, they may be presented to users while contained in other UI components, such as being included in a window, a panel, or a web page. In particular embodiments, there may be multiple presentations modes for presenting images or videos in a user interface.

In particular embodiments, a user may interact with a multimedia UI component using a suitable input device (e.g., a finger or stylus on a touch-sensitive screen or a mouse). For example, the user may play or pause a video, or zoom or pan or rotate an image. In particular embodiments, depending on how or where a multimedia UI component is presented to a user (e.g., which presentation mode it is in), the user's interaction with the multimedia UI component may result in different behaviors from the multimedia UI component.

Object Hierarchy

In particular embodiments, objects may be organized into a hierarchy. For example, objects may be organized into a hierarchy based on how the individual objects are related to each other. The object hierarchy may have any number of levels, and at each level, there may be any number of objects. Parent-child or sibling relationships may exist between specific objects in the hierarchy. Within the hierarchy, a parent object is one level above the level of its child objects. Two sibling objects are at the same level and share the same parent object. In addition, any portion of the hierarchy may also be considered a hierarchy in itself.

Figure 1:
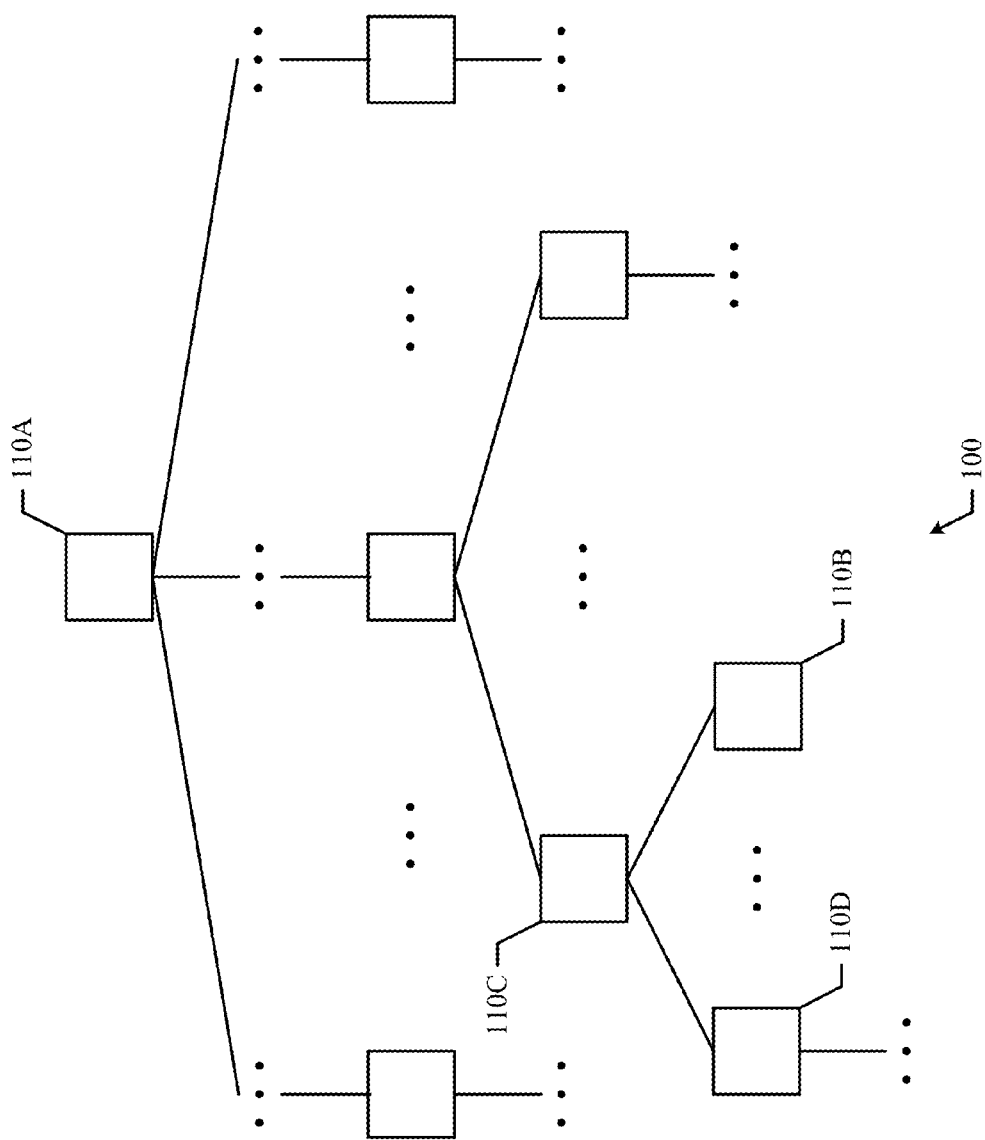
FIG. 1 illustrates a portion of an example object hierarchy.

FIG. 1 illustrates a portion of an example object hierarchy 100 that includes a number of objects 110. In particular embodiments, an object in a hierarchy may or may not have a parent. If an object does not have a parent, it may be referred to as a "root" object (e.g., object 110A). In particular embodiments, an object in a hierarchy may or may not have any children. If an object does not have any children, it may be referred to as a "leaf" or "terminal" object (e.g., object 110B). If an object does have children (e.g., object 110C), it may have any number of children. In addition, objects sharing the same parent may be referred to as each other's "siblings". For example, in FIG. 1, object 110C is the parent of objects 110D and 110B. Objects 110D and 110B are the children of object 110C and are siblings to each other. Thus, a hierarchy of objects (e.g., object hierarchy 100) not only includes the individual objects themselves but also indicates the relationships among the specific objects. Moreover, the position of a specific object within the hierarchy may indicate its relationships with other objects in the hierarchy.

Objects may be of any applicable types. In particular embodiments, an object may be a component of a user interface. In this case, the object hierarchy may be a UI hierarchy (e.g., a hierarchy of UI components). In other words, components of a user interface may be organized into a hierarchy. The UI hierarchy may have any number of layers corresponding to the levels of the object hierarchy, and at each layer, there may be any number of UI components. The position of a specific UI component within the hierarchy may indicate its relationships with other UI components in the hierarchy. The UI components may be presented to users according to the hierarchical structure (e.g., in layers). In particular embodiments, some of these UI components may be multimedia objects, such as images, videos, or audios.

In particular embodiments, an object may correspond to a piece of user-consumable content. In particular embodiments, an object may be consumed by a user if the user may, for example and without limitation, interact with, view, read, listen to, manipulate, or handle the object. For example, some user-consumable objects may be texts, images, videos, audios, feeds, executables (e.g., application programs or games), websites, web pages, digital books, photo albums, posts, or messages. In particular embodiments, user-consumable content, or more specifically, user-consumable objects, may be organized into a hierarchy based on, for example, the relationships among the individual pieces of user-consumable content. Consequently, a hierarchy of user-consumable content may be represented as a hierarchy of objects, where individual objects in the hierarchy may correspond to specific pieces of user-consumable content (e.g., texts, images, videos, audios, executables, etc.). In addition, the structure of the hierarchy indicates the relationships among the specific pieces of user-consumable content.

In particular embodiments, the relationships among the objects in a hierarchy may correspond to how the objects are organized and presented to users. In particular embodiments, when presenting a hierarchy of objects to a user of a device, the objects may be organized and presented according to the structure of the object hierarchy. More specifically, the objects may be presented in a user interface provided on the device according to the structure of the object hierarchy so that the user interface itself becomes hierarchical as well. Consequently, the user interface may include a number of layers, respectively corresponding to the levels in the object hierarchy. The positions of the objects within the hierarchy are preserved in the user interface, such that a specific object at a specific position in the hierarchy is presented in the corresponding position in the user interface. The relationships among the objects within the hierarchy are maintained in the user interface. In other words, there may be an one-to-one correspondence between an object in the object hierarchy and a UI component in the user interface, such that each object is represented by a UI component.

As an example, in the context of the desktop of a computing device, the desktop may be a parent object, and sometimes the root object of a hierarchy, whose child objects are the individual software applications available on the desktop. A software application, while itself being one of the child objects of the desktop, is also the parent object of the individual components of that software application. Different software applications may include different components. For example, for a software application that manages digital books (e.g., a book reader application), its components may include the digital books available, the individual chapters of each book, the pages of each chapter, and the texts, images, videos, audios, or any graphical user interface (GUI) or content or media elements on each page. Each of these also corresponds to an object in the hierarchy. More specifically, when these objects are organized in a hierarchy, the book application may be the parent object of the digital books. A digital book may be the parent object of the individual chapters of that book. A chapter, while itself being one of the child objects of the book, is also the parent object of the pages in that chapter. A page is the parent object of the texts, images, videos, audios, or any GUI or content or media elements on that page. A text block, image, video, audio, or GUI or content or media element is one of the child objects of the page to which it belongs. Similarly, for a software application that manages news feeds, its components may include the individual news channels and the news stories within each channel. Each of these may correspond to an object. When these objects are arranged in a hierarchy, the news-feed application, while itself being one of the child objects of the desktop, is also the parent object of the news channels. A news channel in turn is the parent object of the news stories included in that channel. Some of these objects may respectively correspond to UI components of a user interface presented on the computing device.

As another example, in the context of the Internet or the World Wide Web, the Internet may be a parent object whose child objects are the individual websites. A website, while itself being one of the child objects of the Internet, is also the parent object of the individual web pages of that website. A web page, while itself being one of the child objects of the website to which it belongs, is the parent object of the texts, images, videos, audios, or links (e.g., Uniform Resource Locators (URLs)) included in the web page. Each text block, image, video, audio, or link may also correspond to a specific object in the hierarchy. Some of these objects may respectively correspond to UI components of a web-based user interface that may be presented to a user through a web browser.

As a third example, a website, such as a social-networking website, may also be arranged in such a hierarchical structure for navigating the content of the social-networking website. In this context, the social-networking website may be a parent object whose child objects are the components (e.g., photo albums, user profile pages, etc.) of the website. For example, a photo album, while itself being a child object of the social-networking website, may in turn be a parent object, and the individual photos within the album may be the child objects of the photo album. A user's profile page may be structured in such a hierarchical fashion as well. The profile page itself may be considered a parent object, and the individual objects on the profile page may be the child objects of the profile page. In particular embodiments, a profile page may be considered and rendered (e.g., for presentation to a user) as a linear timeline of objects, such as, for example and without limitation, photos, photo albums, check-ins, comments from other users, attended events, tags, etc. In particular embodiments, child objects in the hierarchy may also include applications the user has added to the profile page, such as a Spotify music sharing application. Moreover, individual stories, songs the user has listened to, and playlists may be child objects at a lower hierarchical level. In particular embodiments, child objects in the hierarchy may include particular sections of a user's profile, such as the user's education and employment information, or the public "wall" of the user's profile page. This disclosure contemplates representing and addressing any collection of content in a hierarchical object or nodal structure. Again, these objects may respectively correspond to UI components of a web-based user interface that may be presented to a user through a web browser.

As these examples illustrate, an object may be of any type and this disclosure contemplates any applicable types of objects. For example and without limitation, the term "object" may refer to any type of content, including but not limited to images, videos, captions, text blocks or boxes, user interface elements, URLs, newsfeed stories, references to other objects, advertisements, calendar events, units for displaying open graph analysis that may be graphically rendered, applications, websites, web pages, books, chapters. In particular embodiments, given a hierarchy of objects, which may be a portion of another, larger hierarchy of objects, the hierarchical relationships (e.g., parent-child or sibling relationships, positions of the objects within the hierarchy) between specific objects may direct some aspects of how these objects behave in the context of a user interface or how the objects are presented to a user.

A hierarchy of objects may be displayed in a user interface that has a corresponding hierarchical structure. In particular embodiments, the user interface may include any number of layers, where each layer corresponds to a specific level of the object hierarchy. In particular embodiments, the lower layers of the user interface correspond to the top levels of the object hierarchy, while the upper layers of the user interface correspond to the bottom levels of the object hierarchy. That is, an object is displayed at a layer in the user interface that is below the layer of its child object and above the layer of its parent object. Since a child object and a parent object are displayed in two separately layers in the user interface, the child object may be considered as "floating" on top of its parent object.

In particular embodiments, the user interface may be displayed on the screen of an electronic device for presentation to users. In particular embodiments, the screen may be touch sensitive and include a touch-sensitive input. A user may interact with various objects displayed on the screen by touching the screen with his fingers.

Shadows Cast by Objects

A display device, such as the screen of an electronic device, is a two-dimensional (2D) medium. Nevertheless, three-dimensional (3D) effect may be simulated (e.g., using shadows and perspective techniques) to present and display an 3D object on such 2D medium, similar to painting a 3D object on a 2D canvas. In particular embodiments, a 3D virtual world may be created and 3D objects may be placed in such a virtual world. Shadows may be cast around an object to simulate the 3D effect. The size, shape, orientation, and color of the shadows may depend on, for example and without limitation, the size, shape, orientation, or color of the object, the distance between the object and the light source, and the spatial relationship between the object and the light source. The objects may be projected and displayed onto a 2D medium using applicable perspective techniques.

Figure 2A:
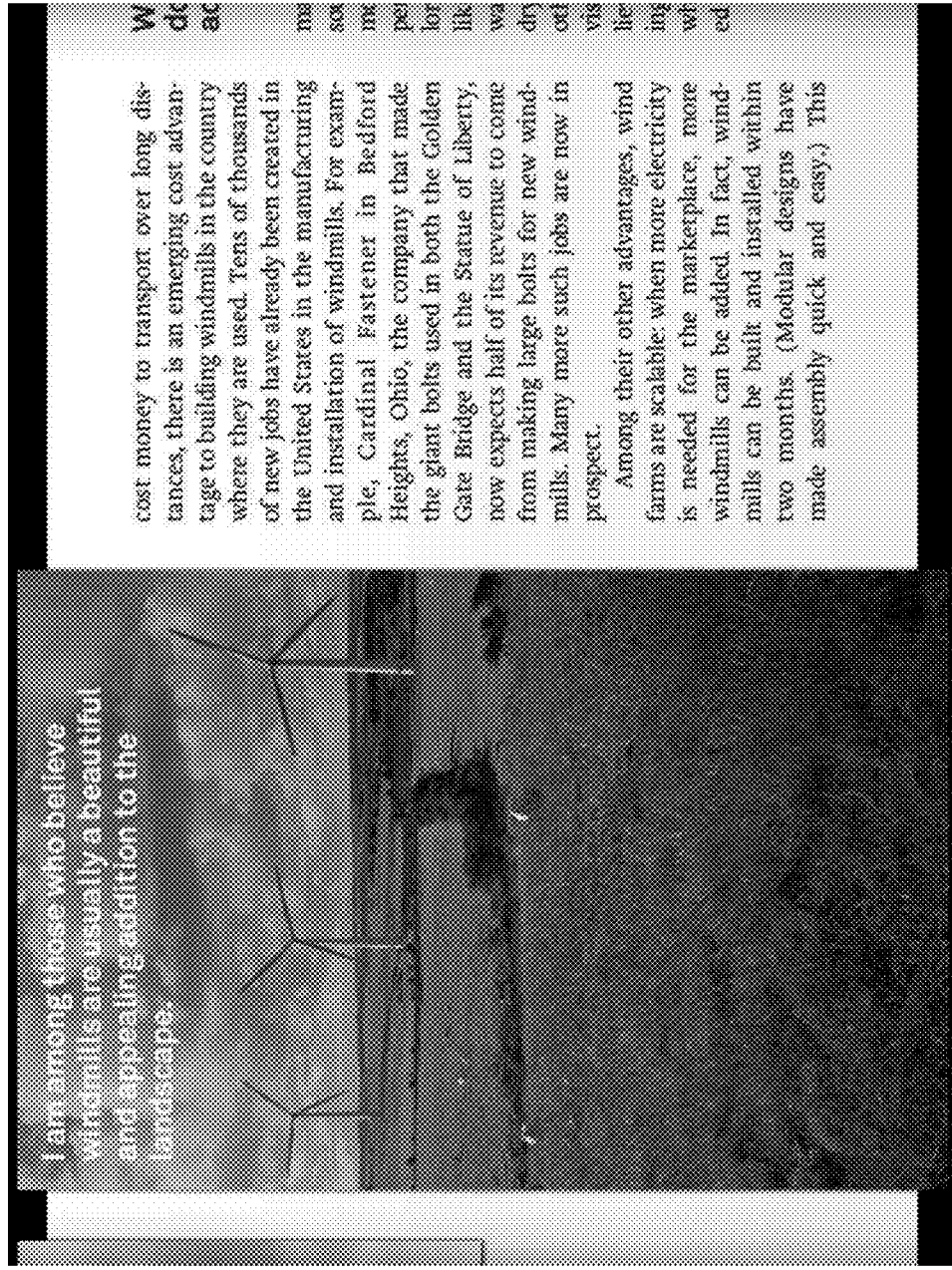
FIGS. 2A-2D illustrate an example of simulating a 3D object on a 2D medium.
Figure 2B:
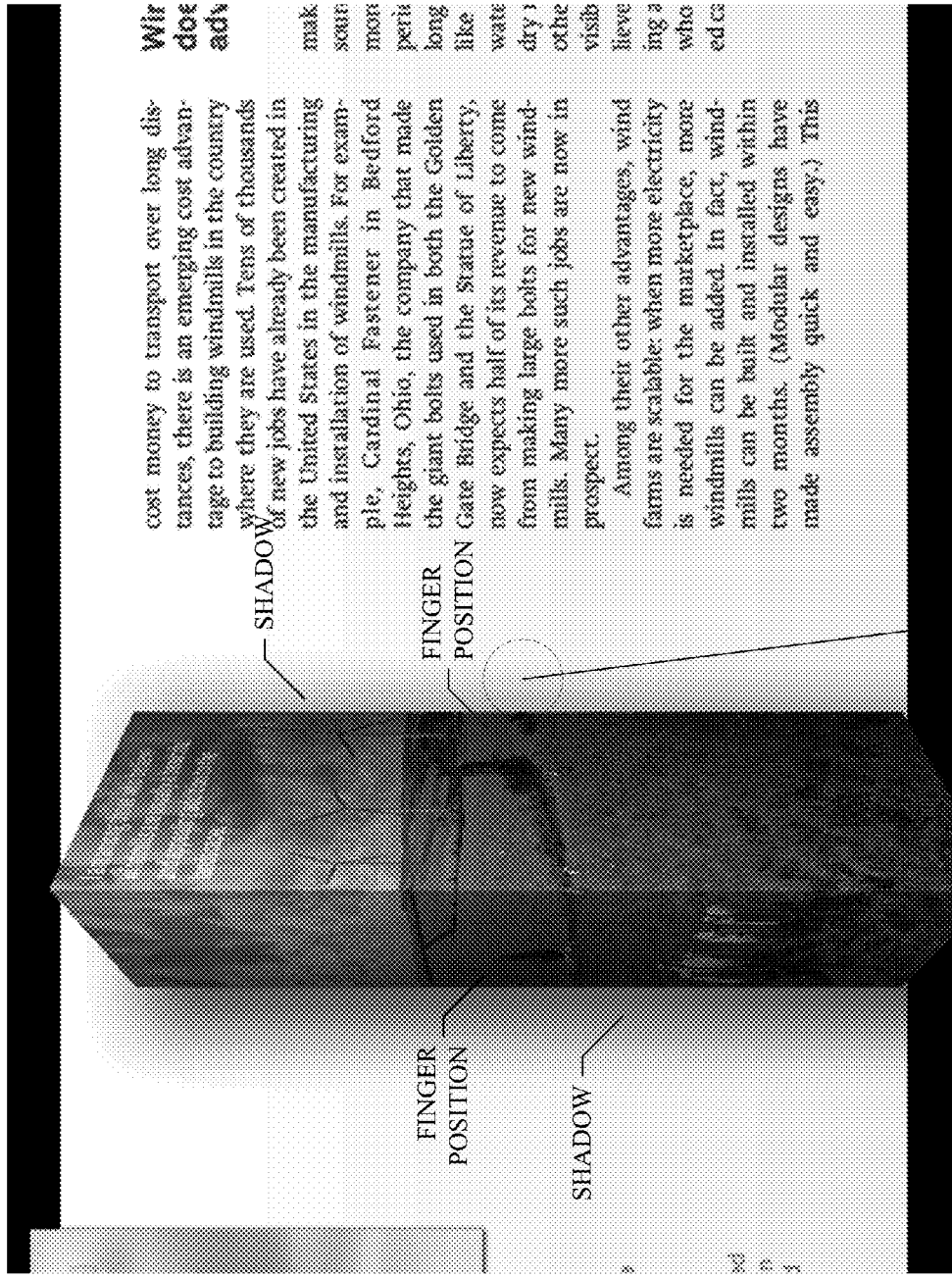

As an example, FIG. 2A illustrates presenting a 3D object in a user interface displayed on a 2D medium and using shadows to simulate the 3D effect. In this case, the user interface is a page 200 of an electronic book. The page may include texts and other multi-media objects, such as image, video, clickable URL, and caption. In FIG. 2A, image 210 visually floats on top of page 200, indicating that users may interact with image 210 in various manners. In fact, in FIG. 2A, only half of the entire image 210 (e.g., a cropped version) is actually shown as image 210 lays flat on page 200. A user may "lift" image 210 up and off page 200 by pinching image 210 with two fingers, as illustrated in FIG. 2B. The two fingers may be placed anywhere near one or more edges of image 210. When image 210 is pinched up and off the page, the entire image appears, but folded at an angle relative to the distance between the two fingers the user used to pinch the image. If the user pinches out beyond a predetermined threshold distance and then takes his fingers off the image, the image expands to fill the entire screen. To simulate the effect of a two-dimensional object (e.g., folded image 210) in a three-dimensional virtual space, shadows are placed around image 210.

In particular embodiments, a light source is simulated to cause the effect of shadowing around a floating object. A virtual 3D space may be constructed to encompass the object and the virtual light source. Light is shone on the object (e.g., image 210), causing shadows to be cast around the object on the background (e.g., page 200).

Figure 2C:
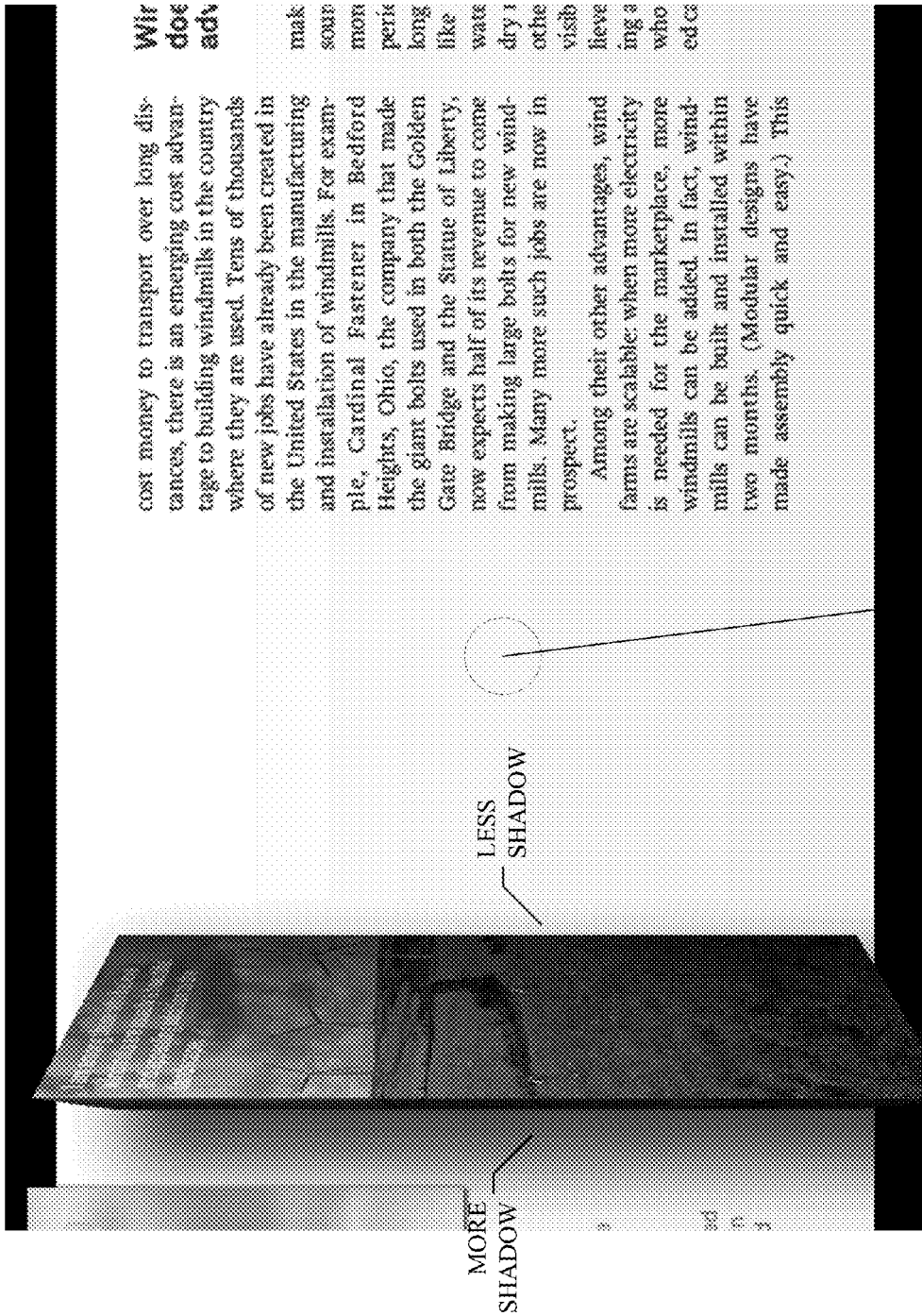
Figure 2D:
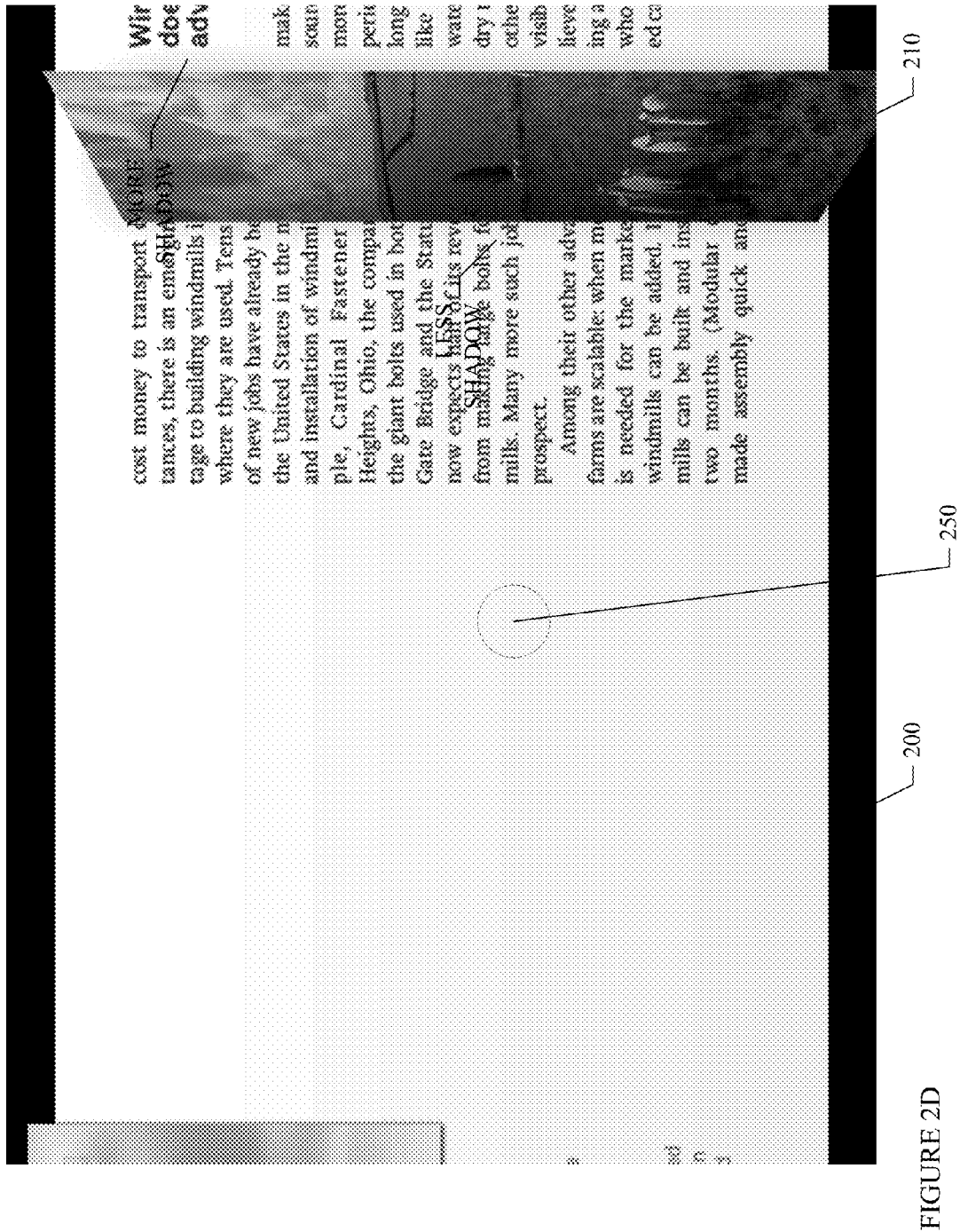

For example, in the case illustrated in FIG. 2B, a simulated light source 250 may be placed in the center of page 200. The shadows around image 210 change depending on the position of image 210 in relation to simulated light source 250. For example, in FIG. 2C, image 210 is moved toward the left side of the screen (e.g., near the left edge of page 200). In this case, there is more, darker shadow on the left side of image 210 and less, lighter shadow on the right side of image 210, as the left side of image 210 faces away from simulated light source 250 and the right side of image 210 faces toward simulated light source 250. In addition, image 210 is rotated more toward the left so that there is more of the right half of image 210 shown but less of the left half of image 210 shown. In contrast, in FIG. 2D, image 210 is moved toward the right side of the screen (e.g., near the right edge of page 200). In this case, there is more, darker shadow on the right side of image 210 and less, lighter shadow on the left side of image 210, as the right side of image 210 faces away from simulated light source 250 and the left side of image 210 faces toward simulated light source 250. In addition, image 210 is rotated more toward the right so that there is more of the left half of image 210 shown but less of the right half of image 210 shown. In particular embodiments, when an object (in the example above, image 210) is manipulated (e.g., moved or rotated), other objects, such as text objects, layered below the image is stationary, permitting the user to manipulate the image and read the entire text simultaneously.

Figure 3A:
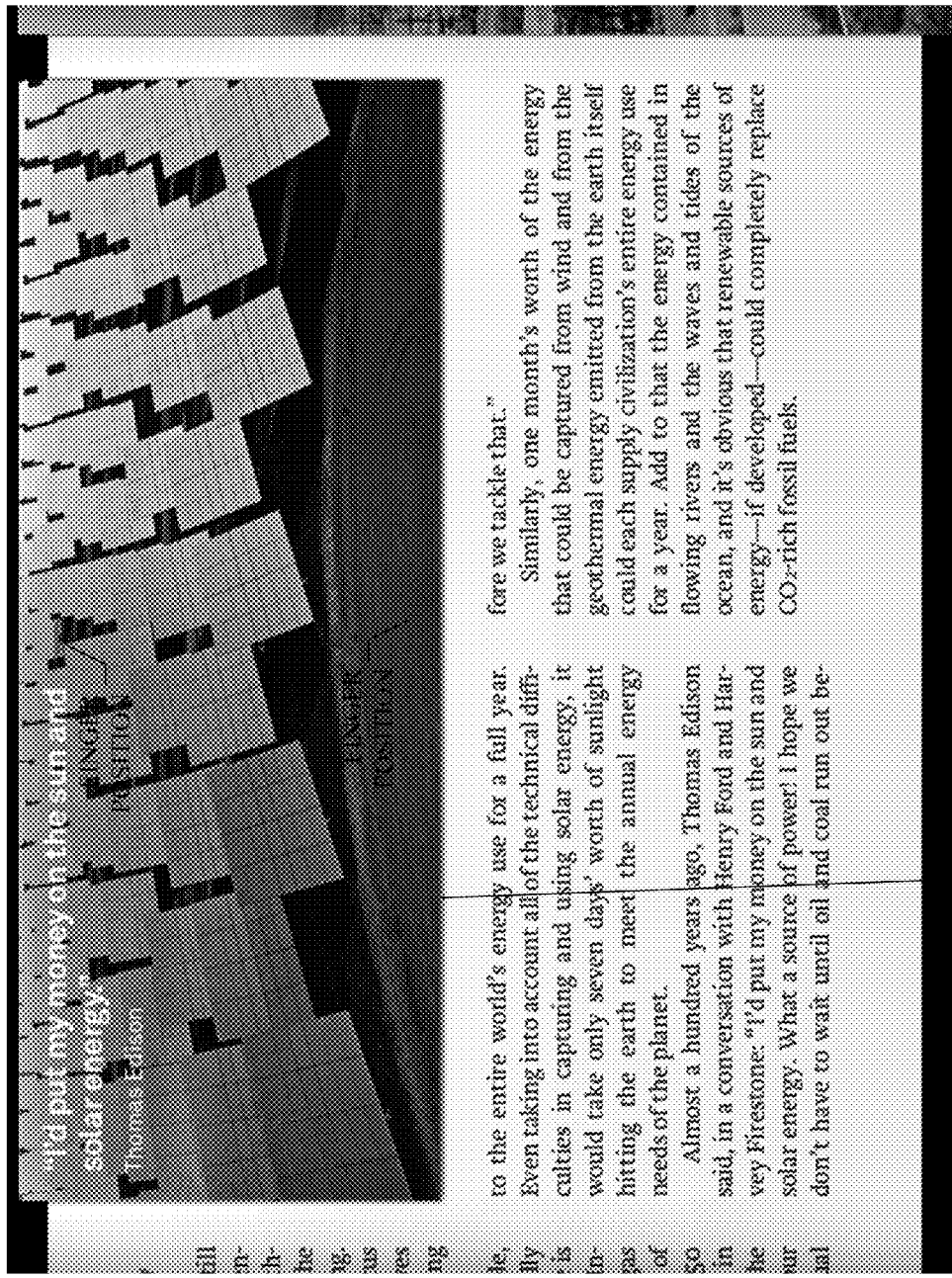
FIGS. 3A-3C illustrate an example of simulating a 3D object on a 2D medium.
Figure 3B:
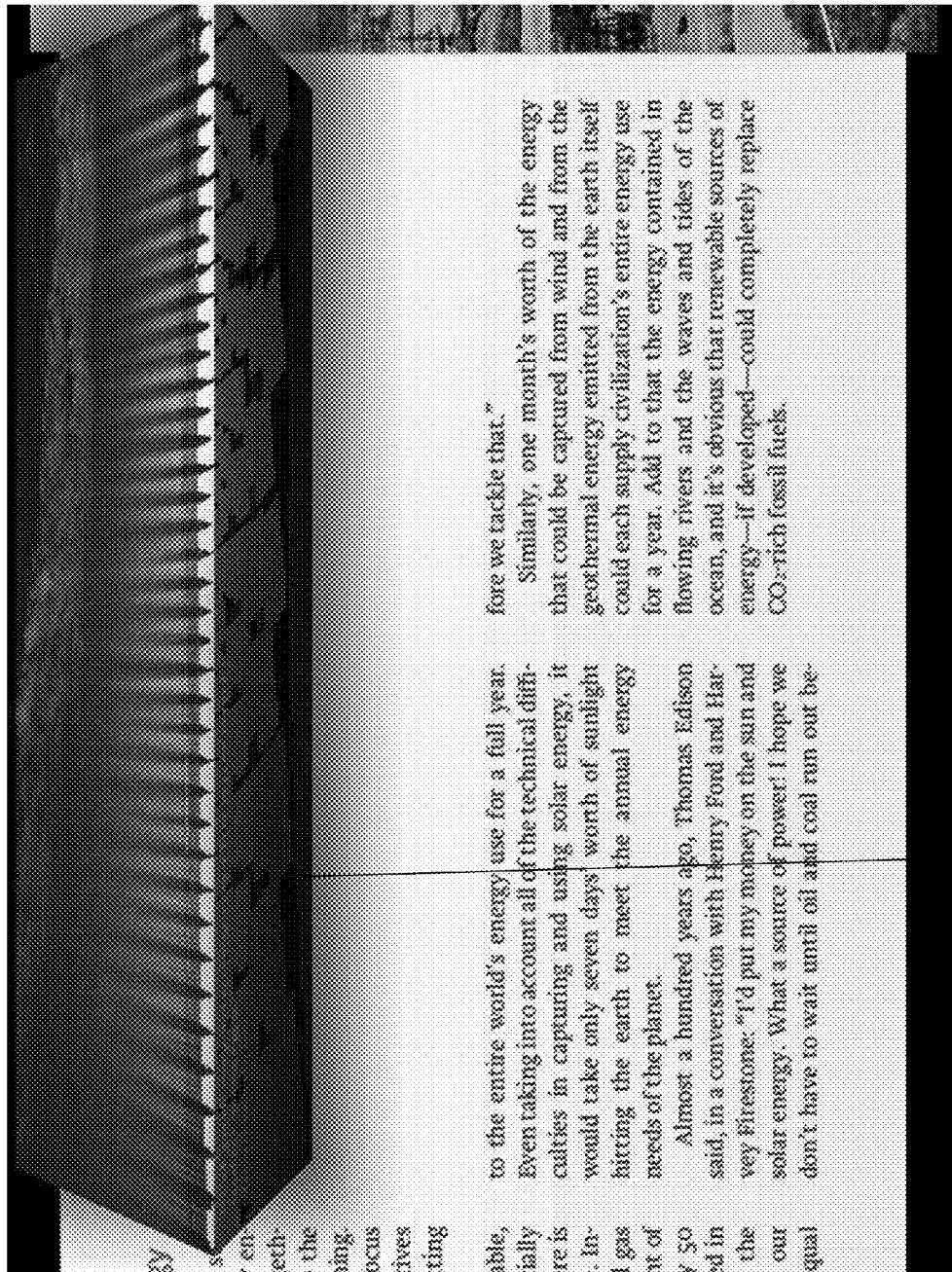
Figure 3C:
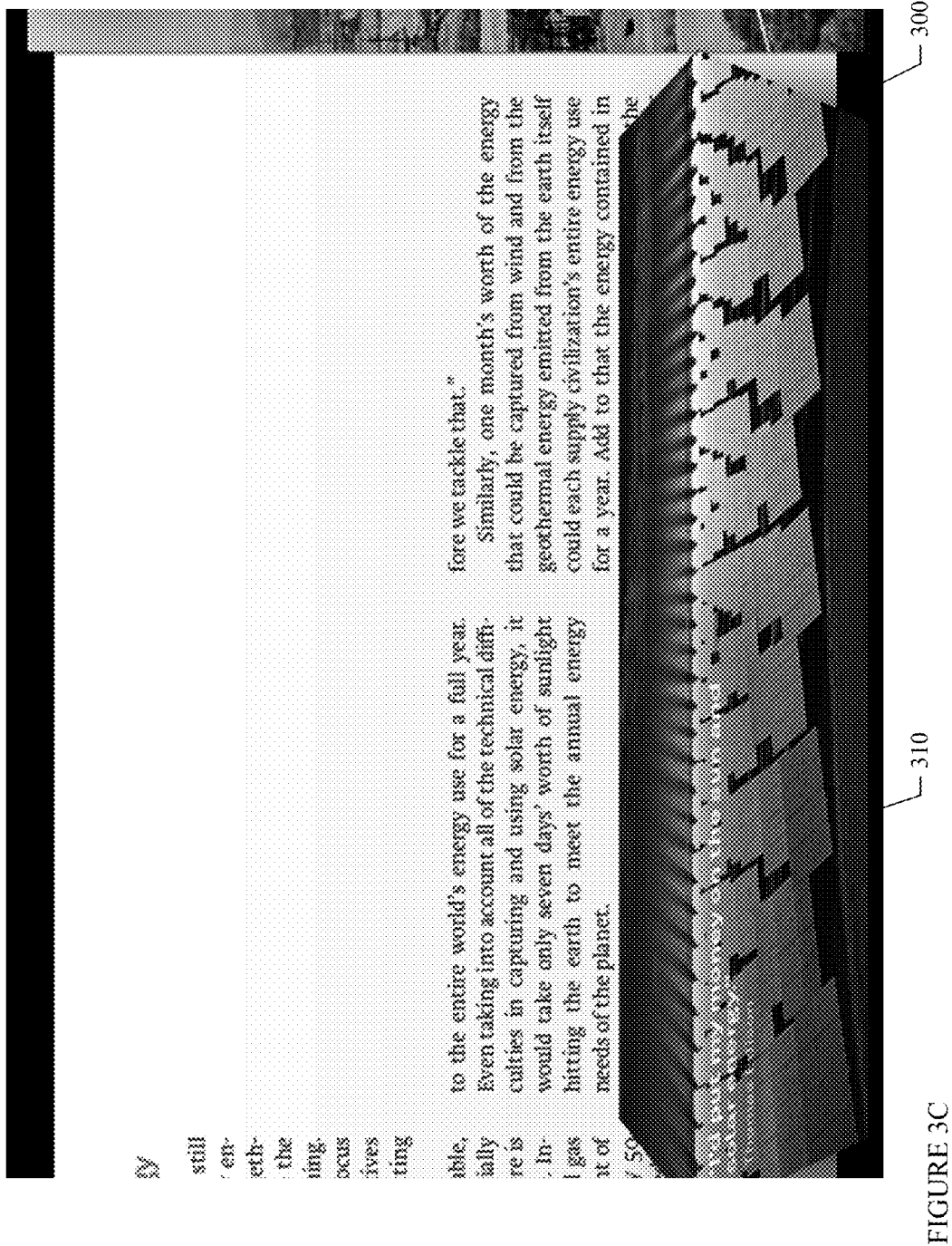

Similar shadowing effect may be applied to an image when the image is pinched up and moved toward the top or bottom of the screen. As an example, a page 300 illustrated in FIG. 3A includes a floating image object 310. In FIG. 3A, again, image 310 is displayed on a page 300 of an electronic book. In FIG. 3A, image 310 lays flat on page 300 and only a portion of image 310 is shown. A user may pinch image 310 up with two fingers (e.g., by placing the two fingers near the opposite edges of image 310). When this happens, image 310 unfolds partially as described above. In FIG. 3B, image 310 is brought near the top of the screen. At this position, image 310 is rotated more toward the bottom so that more of the top half of image 310 is shown, and there is more shadow on the bottom side of image 310 than on the top side of image 310. In this example, a simulated light source is placed above page 300. In contrast, in FIG. 3C, image 310 is brought near the bottom of the screen. At this position, image 310 is rotated more toward the top so that more of the bottom half of image 310 is shown, and there is more shadow on the top side half of image 310 than on the bottom side of image 310.

Figure 4:
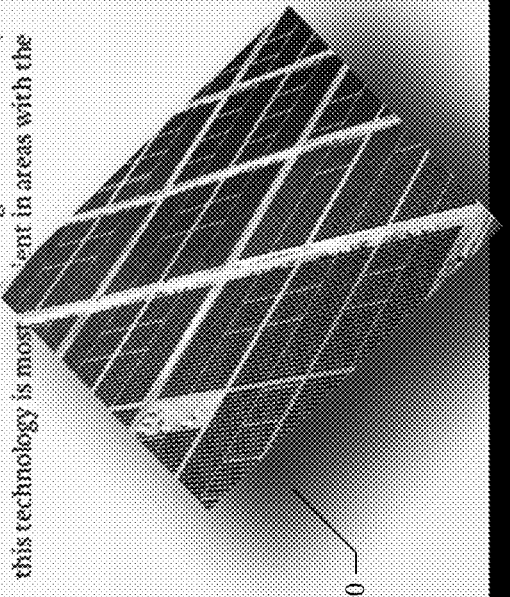
FIG. 4 illustrates an example of simulating a 3D object on a 2D medium.

When a floating object is pinched up, it may be moved to different positions on the screen, as illustrated in FIGS. 2C, 2D, 3B, and 3C. It may also be rotated, as illustrated in FIG. 4. Here, an image 410 included in a page 400 has been pinched up (e.g., using two fingers) and rotated (e.g., by rotating the fingers pinching image 410). The shadows around image 410 rotate with image 410 accordingly to maintain the three-dimensional effect. The shape of the shadows may also be adjusted based on the current spatial relationships between the object and the light source. In addition, as illustrated in FIG. 4, a portion of image 420 overlays the text behind it on page 400. In particular embodiments, when a floating object (e.g., image or video) overlays some text behind it, the appearance of the text may be adjusted to simulate the effect of the shadow casted by the object on the text (e.g., slightly darkened or distorted). In particular embodiments, when an object is picked up (e.g., pinched with two fingers), its size may change with the movement of the two fingers. By moving the two fingers further apart, the object may be enlarged. Conversely, by moving the two fingers closer together, the size of the object may be decreased.

In particular embodiments, when an object is being manipulated by a user (e.g., picked up, rotated, zoomed in or out, etc.), the object itself, not an instance of the object, is manipulated. This ensures the self-consistency of the UI. For example, while a video is being played, the user may manipulate the video object (e.g., pinched down to a thumbnail size or pinched up to full screen). While the video object is being manipulated by the user, the playback of the video continues uninterrupted.

In particular embodiments, to simulate the effect of picking up an object in the three-dimensional virtual space, when an object is picked up, the object below it is moved backward in the virtual three-dimensional space. As an example, to simulate the effect of image 210 being "picked up" from page 200, the size of image 210 (i.e., object) may be increased while the size of page 200 (i.e., background) may be decreased so that it appears as if image 210 is moving closer to the user. As another example, when image 410 is pinched up, page 400 is moved backward to create the visual effect of a greater distance between image 410 and page 400, which in turn simulates the effect of image 410 being picked up from page 400. The shadow image 410 casts on page 400 increases in size accordingly.

Figure 5B:
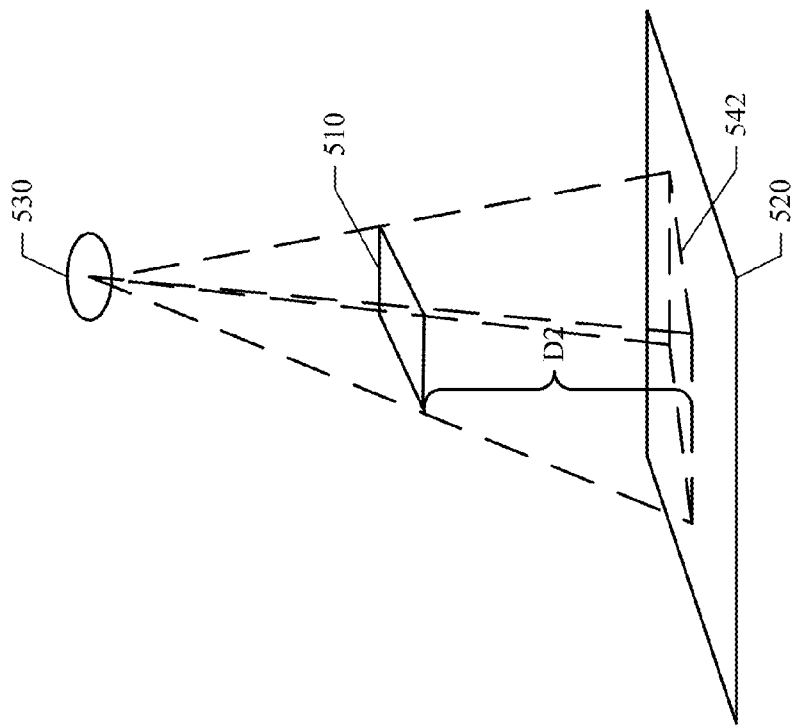
FIGS. 5A-5B illustrate an example of simulating a light source in a virtual 3D space.
Figure 5A:
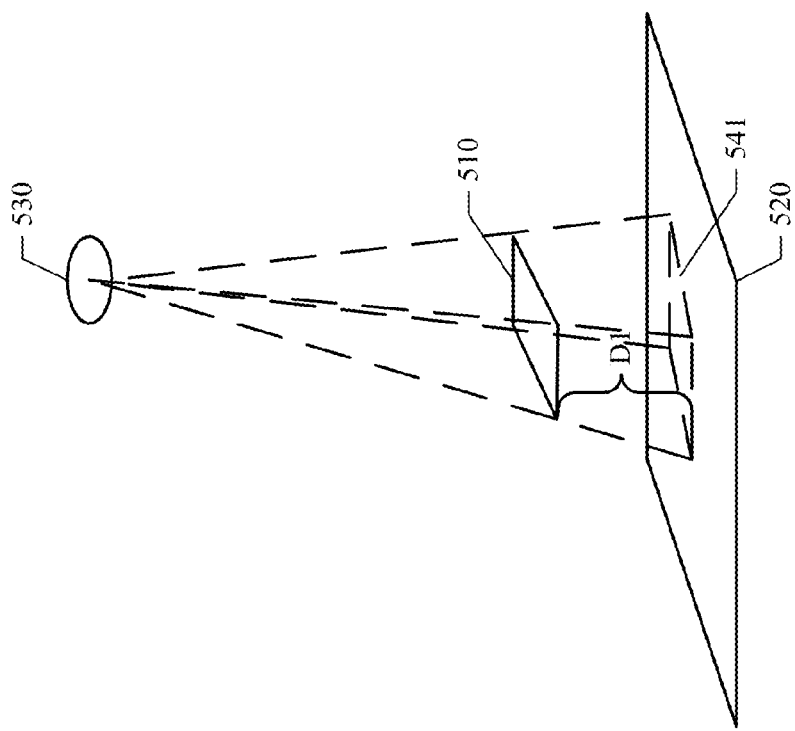

The simulation of the effect of picking up a two-dimensional object in a virtual three-dimensional space is further illustrated in FIGS. 5A-5B. In FIG. 5A, the distance between objects 510 and 520 is D1. A light source 530 above object 510 causes object 510 to cast a shadow 541 of object 510 onto object 520. In FIG. 5B, object 510 has moved away from object 520 and closer to light source 530. The distance between objects 510 and 520 is D2, which is greater than D1. Light source 530 again causes object 510 to cast a shadow 542 of object 510 onto object 520. But because object 510 is now further away from object 520, shadow 542 is larger than shadow 541. Thus, by changing the size of the shadow a first object casts onto a second object, it may stimulate the effect that the first object is moving away from (e.g., increasing shadow size) or moving closer toward the second object (e.g., decreasing shadow size).

In particular embodiments, the shadow of an object (e.g., an image) may be implemented as a separate layer of the user interface. For example, in FIG. 4, image 410 partially overlaps some texts on page 400. There is shadow 420 surrounding image 410. The texts covered by shadow 420 may be darkened accordingly as well. In some implementations, the shadow around an object may be drawn as a blurry dot, sliced up horizontally and vertically, and then stretched up to fill the necessary shadow area. This allows the shadow of an object to be determined without performing ray tracing, which is very computationally intensive and thus resource demanding.

In particular embodiments, when an object is pinched up with two fingers, the size of the object may change depending on the positions of the two fingers. As an example, in FIG. 2B, the two fingers are placed near the opposite edges of image 210. If the two fingers move closer together, image 210 may fold more so that the two edges of image 210 move closer together, following the movement of the two fingers. Conversely, if the two fingers move further apart, image 210 may fold less so that the two edges of image 210 move further apart, again following the movement of the two fingers. The shadows around image 210 also move (e.g., expand or contract in size) with the edges of image 210, following the movement of the two fingers.

In particular embodiments, to render the shadows around an object in a user interface having a hierarchical structure, the object may be rendered on a first layer in the hierarchy while the shadows around the object may be rendered on a second layer, below the first layer, in the hierarchy. In particular embodiments, to simulate the shadows, a dark pixel (e.g., black or dark grey) may be placed behind the object and near the center of the object, and the pixel may be enlarged and blurred until the pixel extends beyond at least some of the edges of the object. In particular embodiments, the color of the pixel may be a gradient, gradually transitioning from light at the edges of the pixel to dark at the center of the pixel, as illustrated in FIG. 4.

Previewing Objects Arranged in a Series

Figure 6:
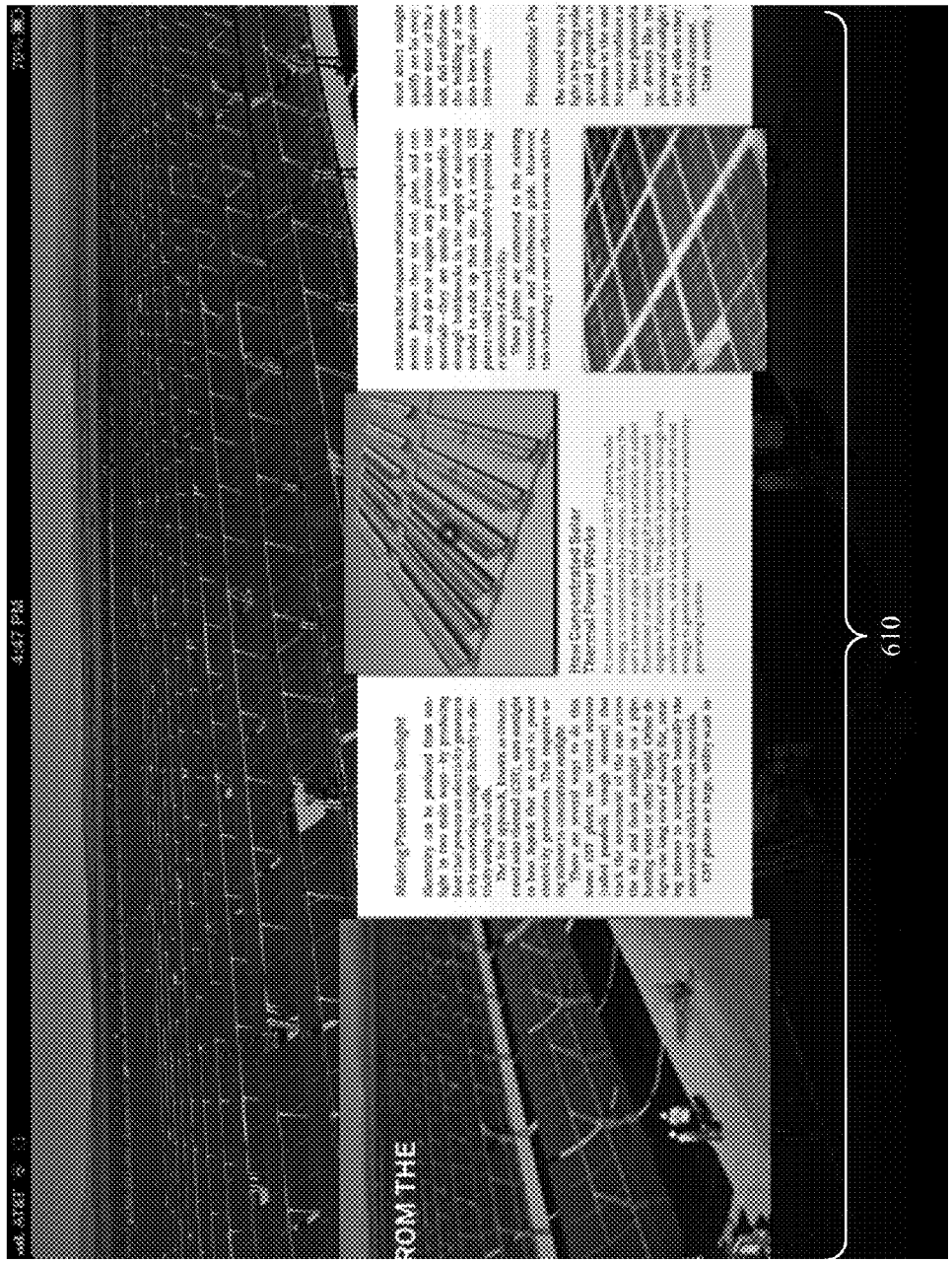
FIG. 6 illustrates an example series of pages in an electronic book.

Sometimes, a collection of objects may be arranged in a series and displayed according to a specific order. Furthermore, due to the size restriction of the display device (e.g., a screen of an electronic device), one object from the series may be displayed at a time. As an example, an electronic book may include many pages. A user may read one page at a time so that one page is displayed on the user's device at a time. Furthermore, the pages are displayed according to a specific order (e.g., the order of the pages in the book). FIG. 6 illustrates a series of pages 610 contained in an electronic book. As another example, a photo album may include many photos. A user may view one photo at a time so that one photo is displayed on the user's device at a time. The photos may be displayed according to a specific order (e.g., chronological order).

In particular embodiments, the display device may be a touch screen device. The user may move forward or backward in the series of objects by swiping fingers across the touch screen (e.g., swiping fingers toward the left side of the screen moves toward the end of the series and swiping fingers toward the right side of the screen moves toward the beginning of the series).

Figure 7A:
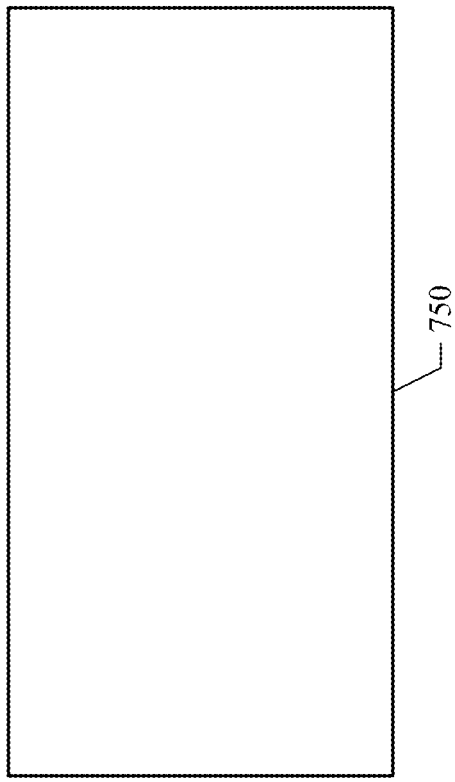
FIGS. 7A-7D illustrate an example of previewing objects arranged in a series.

In particular embodiments, when an object in a series is displayed on the screen, the user may preview the object immediately before or after that object in the series. The object currently being displayed may be referred to as the "current object". As an example, suppose that the pages of an electronic book are displayed one page at a time. In FIG. 7A, a specific page 750 from the book is currently displayed, and current page 750 occupies the entire display screen.

Figure 7B:
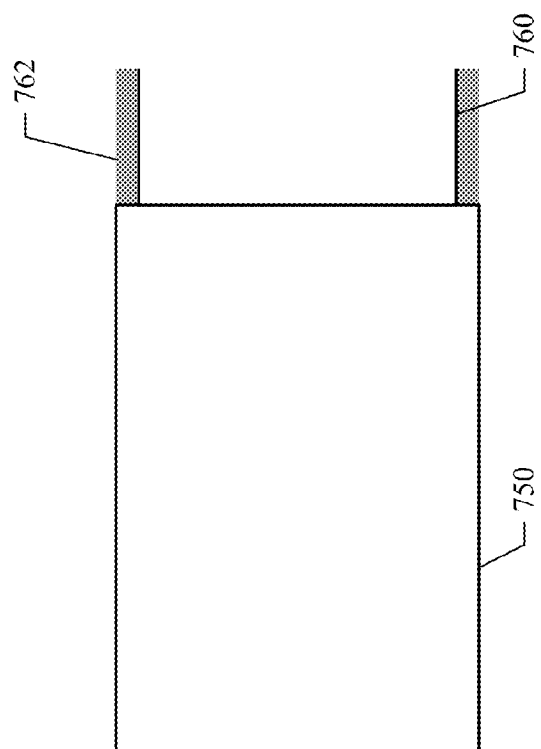

If the user wishes to preview the page immediately after page 750, the user may swipe his fingers across the screen toward the left side of the screen. This may cause page 750 to move toward the left side of the screen corresponding to the movement of the user's fingers. In FIG. 7B, a portion of page 750 has moved off the left edge of the screen. The remaining portion of page 750 now only occupiers a portion of the display screen (on the left side of the screen). At the same time, a portion of page 760, which is the page immediately after page 750, has moved onto the screen and is displayed immediately next to and after page 750, in the available portion on the right side of the display screen. The user may now preview page 760. In particular embodiments, page 760 is displayed in a size smaller than that of page 750. This visually indicates to the user that page 750 is still the current page. In addition, in particular embodiments, a shadow 762 is displayed around page 760 (i.e., the page being previewed). Alternatively, page 760 may be slightly dimmed. This helps the user avoid claustrophobia.

Figure 7C:
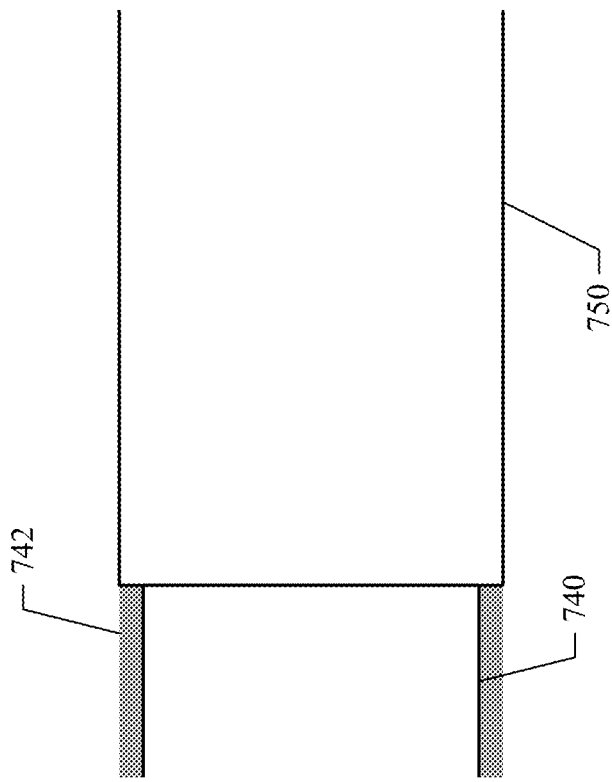

If the user wishes to preview the page immediately before page 750, the user may swipe his fingers across the screen toward the right side of the screen. This may cause page 750 to move toward the right side of the screen corresponding to the movement of the user's fingers. In FIG. 7C, a portion of page 750 has moved off the right edge of the screen. The remaining portion of page 750 now only occupiers a portion of the display screen (on the right side of the screen). At the same time, a portion of page 740, which is the page immediately before page 750, has moved onto the screen and is displayed immediately next to and before page 750, in the available portion on the left side of the display screen. The user may now preview page 740. In particular embodiments, again, page 740 is displayed in a size smaller than that of page 750. This visually indicates to the user that page 750 is still the current page. In addition, in particular embodiments, a shadow 742 is displayed around page 740 (i.e., the page being previewed). Alternatively, page 740 may be slightly dimmed. This helps the user avoid claustrophobia.

Figure 7D:
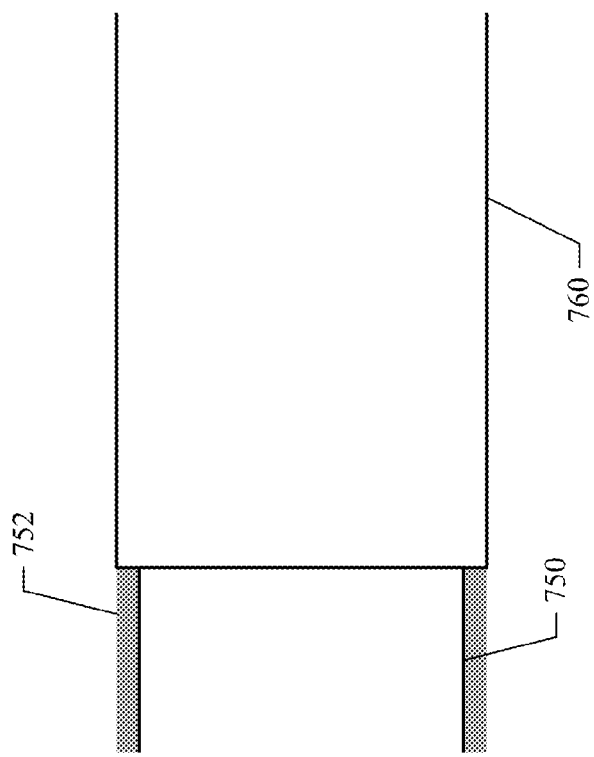

The amount of displacement for page 750 may correspond to the amount of movements of the user's fingers. The speed of the pages' movements may be the same as the speed of the user's fingers' movements. In particular embodiments, if the user's fingers move across the screen for a distance less than a threshold (e.g., half of the width of the screen), then the page immediately before or after the currently displayed page is shown in its preview mode, as illustrated in FIGS. 7B and 7C. On the other hand, if the user's fingers move across the screen for a distance more than a threshold (e.g., half of the width of the screen), then the currently displayed page becomes the secondary page and the previewed page becomes the primary page. For example, in FIG. 7D, the user's fingers have moved toward the left of the screen sufficiently far such that page 750 becomes the secondary page and page 760 (i.e., the page that originally being previewed) becomes the primary page. The size of page 750 is now smaller than that of page 760. Furthermore, the shadow 752 is now around page 750, instead of page 760. At this point, if the user's fingers continue to move toward the left of the screen, eventually, page 750 shall move off the screen completely and page 760 shall move onto the screen completely. Page 760 is then displayed in its entirety and occupiers the entire screen. Page 760 now becomes the current page.

In particular embodiments, when the user releases the pages by moving his fingers away from the touch screen, if the user's fingers have moved across the screen for a distance less than a threshold, then the preview page is moved off the screen while the current page is moved back into its original position so that the entire current page is displayed and occupies the entire screen. On the other hand, if the user's fingers have moved across the screen for a distance more than a threshold, then the original current page is moved off the screen. Instead, the original preview page is centered on the screen so that the entire preview page is displayed and occupies the entire screen. At this point, the preview page becomes the current page. For example, if the user releases the pages in the situation illustrated in FIG. 7C, page 740 (the preview page) moves off the screen and page 750 returns to its original position and occupies the entire screen. On the other hand, if the user releases the pages in the situation illustrated in FIG. 7D, page 750 moves off the screen and page 760 (the preview page) moves to the center of the screen and is displayed in its entirety and occupies the entire screen. Page 760 is now the current page.

Scrolling Through Objects Arranged in a Series

With a collection of objects arranged in a series and displayed according to a specific order, sometimes, the user may also scroll through the objects. Again, the user may swipe his fingers across the screen to move forward or backward along the series. For example, to scroll forward along the series, the user may swipe his fingers toward the left or up side of the screen. Conversely, to scroll backward along the series, the user may swipe his fingers toward the right or down side of the screen.

When the user is scrolling through a series of objects, at any given time, a portion of the series may be displayed on the screen. For example, an electronic book may include a series of pages, and the user may scroll through these pages.

Figure 8A:
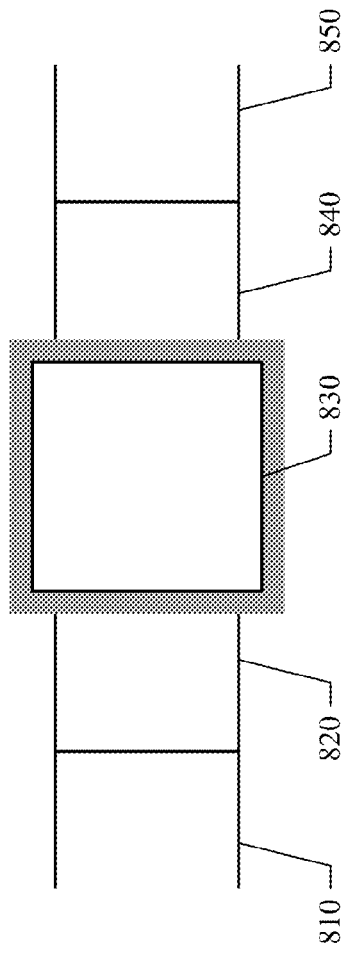
FIGS. 8A-8B illustrate an example of scrolling through a series of objects.

At a particular time, only a few pages in the book are displayed on the screen. An album may include a series of images, and the user may scroll through these images. At a particular time, only a few images in the album are displayed on the screen. As illustrated in FIG. 8A, objects 810, 820, 830, 840, and 850, which may belong to a series of objects (e.g., pages or images) that include other additional objects, may be displayed on the screen at a particular time. Due to the size limitation of the screen, a portion of objects 810 and 850 are cut off at the edge because these two objects are respectively positioned near the left and right sides of the screen and cannot be fit onto the screen completely.

While the user is looking at the objects displayed on the screen at any given time, the user may focus his attention more on the object near the center of the screen. In particular embodiments, the object near the center of the screen (e.g., object 830) may be visually embellished so that it stands out more to the user.

For example, as illustrated in FIG. 8A, object 830 is currently near the center of the screen. Object 830 may be displayed at a size somewhat larger than the other objects 810, 820, 840, 850. There may be a boundary around each object, and the boundary of object 830 currently near the center of the screen may slightly overlap or be on top of objects 820 and 840 positioned immediate to the left and right of object 830. In addition, there may be a shadow around object 830. This disclosure contemplates any applicable visual embellishment for object 830 in order to make it stand out more to the user. In particular embodiments, to make object 830 near the center of the screen stand out, the two objects next to it (i.e., objects 820 and 840) may be slightly darkened.

Figure 8B:
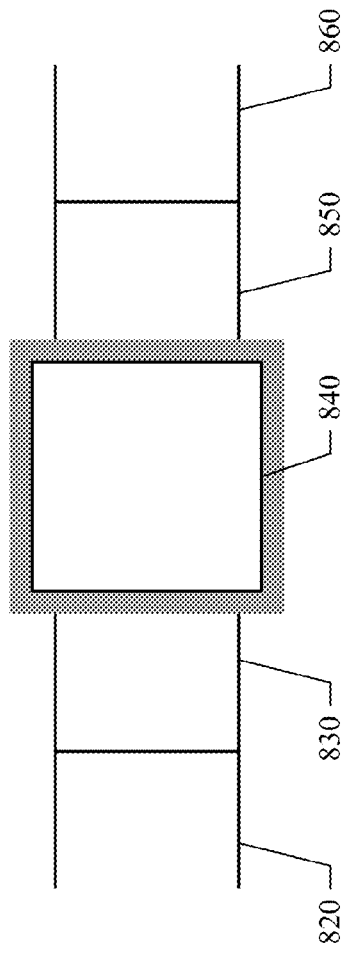

In particular embodiments, the screen may be touch sensitive. The user may swipe his fingers across the screen to scroll through the series of objects. Suppose that the user swipes his fingers toward the left side of the screen so that the user is scrolling toward the back of the series. In this case, objects 810, 820, 830, 840, and 850 may gradually move toward the left (e.g., at the same speed as the user's fingers). As illustrated in FIG. 8B, object 810 may move completely off the screen while object 850 may move completely onto the screen. The object immediately following object 850 in the series (i.e., object 860) may gradually become visible. Further more, object 830 is no longer near the center of the screen. Instead, object 840 is now near the center of the screen.

In particular embodiments, the visual embellishment for object 830 may be removed as it is no longer near the center of the screen. Object 830 is now displayed at the same size as the other objects and there is no shadow around object 830. On the other hand, visual embellishment, such as larger size and shadow, may be applied to object 840 to make it stand out more as it is now near the center of the screen.

In particular embodiments, as the user scroll through a series of objects, at any given time, a portion of the series is displayed on the screen. The particular object that is currently near the center of the screen is visually embellished so that it stands out more. As each object moves near the center of the screen, visually embellishment is applied to that object. As each object moves away from the center of the screen, visual embellishment is removed for that object.

In particular embodiments, objects may be arranged in a hierarchy and displayed in a user interface that has a corresponding hierarchical structure. For example, components of an electronic book may be arranged and displayed hierarchically. The book itself may be at the top level of the hierarchy. The second level may be the individual sections of the book. The third level may be the individual pages of the book. Each page is the child of the section to which it belongs, and each section is the parent of all the pages in that section.

When such a book is displayed in a hierarchical user interface, the relationships between the sections and the pages may be maintained. For example, all the sections may form a series of objects, while all the pages may form another series of objects. The sections may be displayed in one layer of the user interface, while the pages may be displayed in another layer, above the section layer, of the user interface. The user may scroll either the sections or the pages.

In particular embodiments, when the user scrolls through the sections, as the scrolling moves from one section to another section, the pages may be automatically advanced, such that when the user is currently viewing the first section, the pages in the first section are displayed, but when the user is currently viewing the second section, the pages in the second section are displayed. On the other hand, when the user scrolls through the pages, as the scrolling moves from pages of one action to pages of another section, the sections may be automatically advanced, such that when the user is currently viewing the pages of the first section, the first section is displayed, but when the user is currently viewing the pages of the second section, the second section is displayed.

To further explain this scrolling process, suppose that a user has moved to a specific section of the book by sliding a finger in the left direction across the screen of the electronic device. FIG. 9A illustrates a section (e.g., the "Introduction" section) of the book. In this view, the first or title page 930A of the section is used as the background 910 for the entire section. Near the bottom of the screen is a table of contents (TOC) area 920. TOC area 920 includes the individual pages 930 of the current section, shown in thumbnail format and arranged horizontally across the screen of the electronic device. In particular embodiments, each page thumbnail is implemented as an object floating on an imaginary or metaphorical "strip" of paper. The metaphor of objects floating on a strip of paper reflects the nodal hierarchical structure of each section. The background page represents a chapter/section (the parent object), whereas each of the floating objects in the TOC strip is a child object. This disclosure contemplates extension of this concept to any collection of content organized in a hierarchical structure. Thus, a photo album having the aforementioned nodal structure may be rendered as a film strip (parent object) including floating photo thumbnails for each photo contained in the album (child objects). As another example, a user profile or timeline may be represented as an infinite imaginary strip of paper (the parent object) containing a plurality of floating thumbnails representing photo albums, applications, events, etc. (child objects), each of which may contain its own child objects.

FIG. 9A illustrates a layered arrangement of objects corresponding to an object hierarchy. In this case, background area 910 is the bottom layer. TOC area 920 is another layer positioned on top of the background layer. Pages 930 are a third layer positioned on top of the TOC layer. In an object hierarchy, the background may be the parent of the TOC, and the TOC may be the parent of the pages.

Figure 9B:
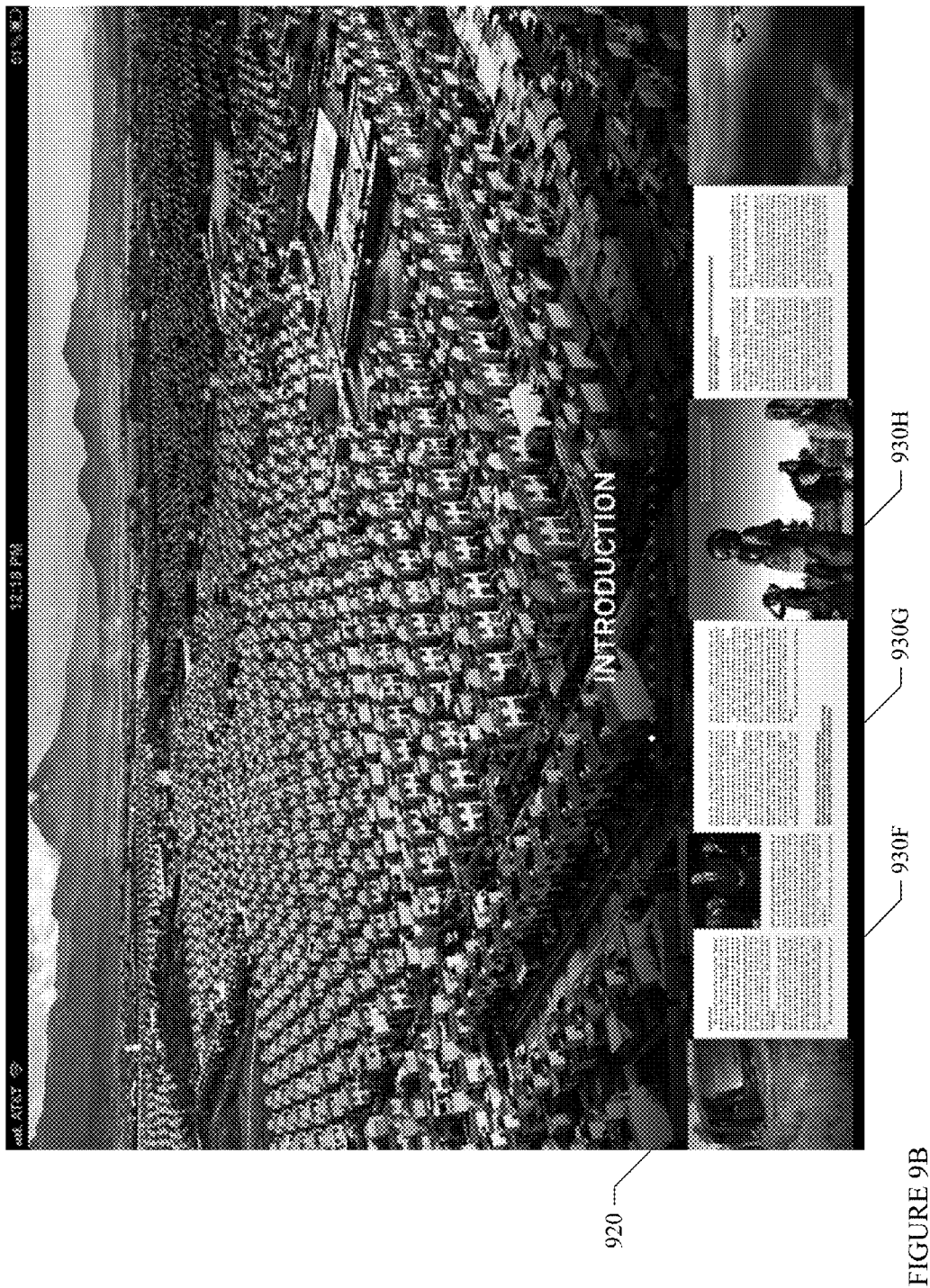

A user may move forward and backward to different pages in the section by sliding a finger in the left or right directions, respectively, across TOC area 920. Suppose that a user has slide a finger in the left direction across TOC area 920. In FIG. 9B, more pages (e.g., pages 930F, 930G, 930H) of the current "Introduction" section appears in TOC area 920.

Figure 9C:

Similarly, a user may move forward and backward to different sections in the book by sliding a finger in the left or right directions, respectively, either across background area 910 or across TOC area 920. When the user slides a finger across TOC area 920, the current section switches to the next section when the user reaches the last page of the current section; or the current section switches to the previous section when the user reaches the first page of the current section. FIG. 9C illustrates the transition between the "Introduction" section and "Chapter 1" of the book. Here, the "Introduction" section is currently being viewed, and "Chapter 1" is the section that immediately follows the "Introduction" section in the book. In one situation, as a user's finger slides in the left direction across TOC area 920, eventually the last page of the "Introduction" section is reached. At this point, title page 930A of the "introduction" section displayed in background area 910 gradually moves left out of view, in synchronization with the movement of the last few pages of the "Introduction" section. At the same time, the tile page 940A of "Chapter 1" gradually moves left into view to be displayed in background area 910, also in synchronization with the movement of the first few pages of "Chapter 1". Eventually, title page 940A of "Chapter 1" replaces title page 930A of the "Introduction" section when "Chapter 1" becomes the current section being viewed by the user. In another situation, as a user's finger slides in the left direction across background area 910, title page 930A of the "Introduction" section gradually moves left out of view, following by title page 940A of "Chapter 1", which gradually moves left into view to be displayed in background area 910, effectively replacing title page 930A of the "Introduction" section. In synchronization with the movement of title pages 930A and 940A, the last few pages of the "Introduction" section gradually move left out of view and the first few pages of "Chapter 1" gradually move left into view in TOC area 920. As illustrated in FIG. 9C, at the point of transition 950 between the two sections, the right or left edge of the title page in background area 910 lines up with the right or left edge of the last or first page, respectively, of the corresponding section in TOC area 920. The transition between a current section and a section immediately before the current section behaves similarly, with the exception that instead of moving in the left direction across the screen of the electronic device, objects move in the right direction.

User Intent During Scrolling

When the user is scrolling through objects in a hierarchy, as the user's fingers swipe across the screen, particular embodiments may estimate which specific object the user will view at a predetermined time in the future (e.g., 0.2 seconds in the future) based on the velocity or acceleration of the finger movements. For example, as the user is scrolling through a series of sections in a book, where each section may include a number of pages, particular embodiments may estimate which section the user will view 0.5 seconds in the future. As the user is scrolling through a series of photo albums, where each album may include a number of photos, particular embodiments may estimate which album the user will view 0.4 seconds in the future. This may enable the device to preload (e.g., download or render) the pages in that section or the photos in that album so that when the user is ready to view the pages or photos, they are already available and ready. In other words, as the user is scrolling through objects at a specific level of the hierarchy, particular embodiments may estimate which object the user will view at a predetermined time in the future. Then the child objects of that object may be preloaded so that they are ready for the user. For example, the child objects may be downloaded from a server or rendered on the user's device.

In particular embodiments, as the user swipes his fingers across the screen to scroll through a series of object, the velocity of the finger movements may be detected. The acceleration of the finger movements may be computed based on the velocity. The estimation may be based on the acceleration. For example, higher acceleration may suggest that the user will view an object further away from the object currently being displayed on the screen while lower acceleration may suggest that the user will view an object closer to the object currently being displayed on the screen at the predetermined time in the future.

In particular embodiments, the vector of the user's touch input, or its derivative vector, may be utilized to ascertain whether a user wishes to browse other objects on the same hierarchical level as the current object, or the child objects of the current object. For example, if a user is swiping through a series of photo album objects on a profile page in a social networking website, the touch input vector may have a high velocity, or, even more tellingly, a high acceleration. Such an input may signal to the application that the user wishes to browse other photo albums, and the application may begin downloading photo album thumbnails based on the magnitude of acceleration or velocity of the input vector. For example, if a user swipes from the ith album at a high velocity or acceleration, the application may load thumbnails for the (i+10)th album, whereas if a user swipes slowly from the ith album, the application may load thumbnails for the (i+1)th album. Conversely, if there is no velocity or acceleration to the input vector (i.e., no swiping input), the application may begin to download the child objects (individual photos) of the currently viewed album cover. In the context of a digital book, content elements may be pre-drawn and loaded into a buffer based on where the user has scrolled; the digital book application extrapolates from the user's screen size to determine the size and contents of the buffer.

Spring Motions During Object Animation

In particular embodiments, movements of an object displayed in a user interface on a screen may be simulated based on spring movement. As the user interacts with the object, the object may move around the screen. This may be shown as animated sequences depicting the object's movements. For example, as the user picks up an object by pinching the object with two fingers, the object may move with the user's fingers. If the use releases the object, the object may return to its original position. The user may throw the object against the edge of the screen, causing the object to bounce around the screen.

In particular embodiments, movements of the object may be simulated by attaching one end of a virtual spring to the object and another end of the virtual spring to a position on the screen (e.g., the original position of the object, the center of the screen, a corner of the screen, or an edge of the screen). Any number of virtual springs may be attached to an object. In particular embodiments, the movements of the object may be determined based on Hooke's law: $F=-kx$; where x is the displacement of the spring's end from it's equilibrium position (e.g., a distance, in SI units: meters), F is the restoring force exerted by the spring on that end (in SI units: N or kg·m/s$^2$), and k is a constant called the rate or spring constant (in SI units: N/m or kg/s$^2$). When this equation holds, the behavior is said to be linear. The negative sign on the right hand side of the equation is there because the restoring force always acts in the opposite direction of the displacement (e.g., when a spring is stretched to the left, it pulls back to the right). In general, the following properties are involved in determining spring movement: mass, damping, spring stiffness, spring rest length. In some implementations, a virtual mass may be assigned to the object.

In particular embodiments, a virtual spring may have different state values based on what the user is doing (e.g., how the user is interacting with the object). The spring may ramp from one set of state value to another, instead of cutting, to make animation sequence of the object's movements appear more natural. For example the distance between an edge of the object and the user's finger on the object may be used to determine the tightening of the springs used in the animation or the level of ramping from one set of state values to another.

In particular embodiments, a physics engine implements the algorithms that simulate spring movement. A number of springs may be attached to an object. For example, if an object is pinched by a user with two fingers, two springs may be attached to the object at the positions corresponding to the fingers pinching the object. As the object moves (e.g., dragged by the user's fingers), its movement follows the paths of the springs, so that the movement of the object is animated based on the physics of the spring movement. In particular embodiments, the algorithm may take into consideration variables such as tension, mass, damping effect, the velocity of the finger's movement, etc. As an example, if the user's finger moves faster, it may cause the object to bounce more. Conversely, if the user's finger moves slower, the object may bounce less. As another example, the springs may tighten or loosen depending on where the fingers touch and pinch an object. When the spring is closer to a finger, it may tighten. When the spring is further away from a finger, it may loosen. When the spring tightens (e.g., an image is more folded due to the user's fingers pinching the image moving closer together), there may be less movement on the part of the object. Conversely, when the spring loosens (e.g., an image is less folded due to the user's fingers pinching the image moving further apart), there may be more movement on the part of the object. In some implementations, when two fingers pinching an image move apart to unfold the image or move close to fold the image, the edges of the image pinched by the two fingers may first unfold or fold pass the fingers' positions, and then bounce and fold or unfold back to find the correction positions of the fingers, and thus the correct degree of unfolding or folding. This allows the image to determine its folding and unfolding degrees in real time.

In particular embodiments, the movement of an object may be predicted based on a user's intent. For example, if a user picks up an object and then moves the fingers toward the left side of the screen, the user's intent may be to place the object near the left side of the screen. The object's final position may be projected based on the direction as well as the velocity of the user's finger movement (e.g., the position the object may move to in 0.5 seconds time).

In particular embodiments, animation of the objects are implemented based on the algorithms implemented in the physical engine. For example, when an object is pinched up, moved to a different position, and then released, the object may bounce around a little. This is implemented as an animation sequence. The bouncing path and characteristics of the movement may be governed by the algorithms implemented in the physics engine.

In particular embodiments, when an image is picked up, the animation of its movements following the user's fingers may be based on spring motions. For example, how much should the image fold or unfold, how much should the image rotate, or how much should the image bounce against the edge of the screen, as the user's fingers move may be determined based on spring motions. In particular embodiments, an image's movements may be simulated by, supposedly, attaching the image to an imaginary spring. When the user's fingers pick up the image, the supposed force the user's fingers exert on the image may cause the image to have supposed mass. When an object with mass (e.g., an image with supposed mass) is attached to a spring, its movements may follow specific physical properties. In addition to the mass, the spring may have properties such as, for example and without limitation, tension, stretch, and dampening. By selecting various values for these properties, different movements of the image may be simulated.

In particular embodiments, when zooming in on an object, the object increases in size. When zooming out on an object, the object decreases in size. The changing of the object's size may be depicted in an animation sequence, where the movements of the object may be based on spring movements.

In particular embodiments, as an object moves towards its final destination, the intermediate positions of the object may be interpolated based on spring movements.

Electronic Device

Figure 10:
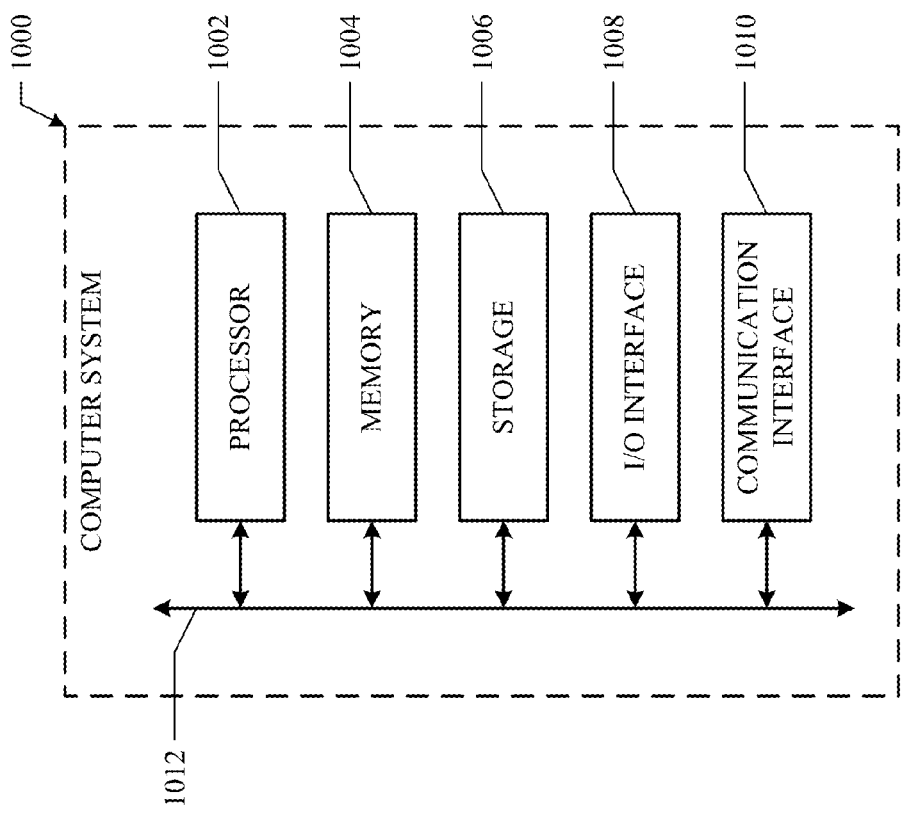
FIG. 10 illustrates an example electronic device.

Particular embodiments may be implemented on one or more electronic devices or computer systems. For example, the user interface may be displayed on the screen of such an electronic device. FIG. 10 illustrates an example electronic device 1000. In particular embodiments, one or more computer systems 1000 perform one or more steps of one or more methods described or illustrated herein. In particular embodiments, one or more computer systems 1000 provide functionality described or illustrated herein. In particular embodiments, software running on one or more computer systems 1000 performs one or more steps of one or more methods described or illustrated herein or provides functionality described or illustrated herein. Particular embodiments include one or more portions of one or more computer systems 1000.

This disclosure contemplates any suitable number of computer systems 1000. This disclosure contemplates computer system 1000 taking any suitable physical form. As example and not by way of limitation, computer system 1000 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, or a combination of two or more of these. Where appropriate, computer system 1000 may include one or more computer systems 1000; be unitary or distributed; span multiple locations; span multiple machines; or reside in a cloud, which may include one or more cloud components in one or more networks. Where appropriate, one or more computer systems 1000 may perform without substantial spatial or temporal limitation one or more steps of one or more methods described or illustrated herein. As an example and not by way of limitation, one or more computer systems 1000 may perform in real time or in batch mode one or more steps of one or more methods described or illustrated herein. One or more computer systems 1000 may perform at different times or at different locations one or more steps of one or more methods described or illustrated herein, where appropriate.

In particular embodiments, computer system 1000 includes a processor 1002, memory 1004, storage 1006, an input/output (I/O) interface 1008, a communication interface 1010, and a bus 1012. Although this disclosure describes and illustrates a particular computer system having a particular number of particular components in a particular arrangement, this disclosure contemplates any suitable computer system having any suitable number of any suitable components in any suitable arrangement.

In particular embodiments, processor 1002 includes hardware for executing instructions, such as those making up a computer program. As an example and not by way of limitation, to execute instructions, processor 1002 may retrieve (or fetch) the instructions from an internal register, an internal cache, memory 1004, or storage 1006; decode and execute them; and then write one or more results to an internal register, an internal cache, memory 1004, or storage 1006. In particular embodiments, processor 1002 may include one or more internal caches for data, instructions, or addresses. This disclosure contemplates processor 1002 including any suitable number of any suitable internal caches, where appropriate. As an example and not by way of limitation, processor 1002 may include one or more instruction caches, one or more data caches, and one or more translation lookaside buffers (TLBs). Instructions in the instruction caches may be copies of instructions in memory 1004 or storage 1006, and the instruction caches may speed up retrieval of those instructions by processor 1002. Data in the data caches may be copies of data in memory 1004 or storage 1006 for instructions executing at processor 1002 to operate on; the results of previous instructions executed at processor 1002 for access by subsequent instructions executing at processor 1002 or for writing to memory 1004 or storage 1006; or other suitable data. The data caches may speed up read or write operations by processor 1002. The TLBs may speed up virtual-address translation for processor 1002. In particular embodiments, processor 1002 may include one or more internal registers for data, instructions, or addresses. This disclosure contemplates processor 1002 including any suitable number of any suitable internal registers, where appropriate. Where appropriate, processor 1002 may include one or more arithmetic logic units (ALUs); be a multi-core processor; or include one or more processors 1002. Although this disclosure describes and illustrates a particular processor, this disclosure contemplates any suitable processor.

In particular embodiments, memory 1004 includes main memory for storing instructions for processor 1002 to execute or data for processor 1002 to operate on. As an example and not by way of limitation, computer system 1000 may load instructions from storage 1006 or another source (such as, for example, another computer system 1000) to memory 1004. Processor 1002 may then load the instructions from memory 1004 to an internal register or internal cache. To execute the instructions, processor 1002 may retrieve the instructions from the internal register or internal cache and decode them. During or after execution of the instructions, processor 1002 may write one or more results (which may be intermediate or final results) to the internal register or internal cache. Processor 1002 may then write one or more of those results to memory 1004. In particular embodiments, processor 1002 executes only instructions in one or more internal registers or internal caches or in memory 1004 (as opposed to storage 1006 or elsewhere) and operates only on data in one or more internal registers or internal caches or in memory 1004 (as opposed to storage 1006 or elsewhere). One or more memory buses (which may each include an address bus and a data bus) may couple processor 1002 to memory 1004. Bus 1012 may include one or more memory buses, as described below. In particular embodiments, one or more memory management units (MMUs) reside between processor 1002 and memory 1004 and facilitate accesses to memory 1004 requested by processor 1002. In particular embodiments, memory 1004 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 1004 may include one or more memories 1004, where appropriate. Although this disclosure describes and illustrates particular memory, this disclosure contemplates any suitable memory.

In particular embodiments, storage 1006 includes mass storage for data or instructions. As an example and not by way of limitation, storage 1006 may include an HDD, a floppy disk drive, flash memory, an optical disc, a magneto-optical disc, magnetic tape, or a Universal Serial Bus (USB) drive or a combination of two or more of these. Storage 1006 may include removable or non-removable (or fixed) media, where appropriate. Storage 1006 may be internal or external to computer system 1000, where appropriate. In particular embodiments, storage 1006 is non-volatile, solid-state memory. In particular embodiments, storage 1006 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 1006 taking any suitable physical form. Storage 1006 may include one or more storage control units facilitating communication between processor 1002 and storage 1006, where appropriate. Where appropriate, storage 1006 may include one or more storages 1006. Although this disclosure describes and illustrates particular storage, this disclosure contemplates any suitable storage.

In particular embodiments, I/O interface 1008 includes hardware, software, or both providing one or more interfaces for communication between computer system 1000 and one or more I/O devices. Computer system 1000 may include one or more of these I/O devices, where appropriate. One or more of these I/O devices may enable communication between a person and computer system 1000. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 1008 for them. Where appropriate, I/O interface 1008 may include one or more device or software drivers enabling processor 1002 to drive one or more of these I/O devices. I/O interface 1008 may include one or more I/O interfaces 1008, where appropriate. Although this disclosure describes and illustrates a particular I/O interface, this disclosure contemplates any suitable I/O interface.

In particular embodiments, communication interface 1010 includes hardware, software, or both providing one or more interfaces for communication (such as, for example, packet-based communication) between computer system 1000 and one or more other computer systems 1000 or one or more networks. As an example and not by way of limitation, communication interface 1010 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 1010 for it. As an example and not by way of limitation, computer system 1000 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 1000 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 1000 may include any suitable communication interface 1010 for any of these networks, where appropriate. Communication interface 1010 may include one or more communication interfaces 1010, where appropriate. Although this disclosure describes and illustrates a particular communication interface, this disclosure contemplates any suitable communication interface.

In particular embodiments, bus 1012 includes hardware, software, or both coupling components of computer system 1000 to each other. As an example and not by way of limitation, bus 1012 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 1012 may include one or more buses 1012, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage medium or media, or any suitable combination of two or more of these, where appropriate. A computer-readable non-transitory storage medium or media may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

This disclosure encompasses all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A computer-implemented method comprising:
    loading, into a memory of a user device, at least a first set of a plurality of objects in a hierarchy upon opening of the first set of the objects, the hierarchy having one or more layers and each layer having at least one of the objects,
        wherein the loaded objects comprise a first set of parent objects and, for at least one of the parent objects, a set of child objects associated with the parent object in the hierarchy,
        wherein the first set of parent objects comprises a table of contents section that comprises a plurality of thumbnails, and
        wherein the table of contents section and the corresponding thumbnails are loaded into the memory of the user device;
    displaying a subset of the loaded objects on a screen of the user device, the displayed objects comprising:
        at least one parent object of the first set of parent objects, wherein the loaded parent objects are successively presented in a sequence when scrolling input is received with respect to the displayed parent objects; and
        one or more child objects, each of the displayed child objects being associated with one of the displayed parent objects; and
    in response to receiving the scrolling input with respect to the displayed parent objects, preloading a second set of a plurality of objects in the hierarchy different from the first set of the plurality of objects to be displayed after the displayed subset of loaded objects based on the acceleration of the received scrolling input through the sequence of parent objects such that
        when the acceleration of the received scrolling input is less than or equal to a predetermined acceleration, the preloading of the second set of the plurality of objects includes preloading and storing one or more child objects associated with at least one of the loaded parent objects; and
        when the acceleration of the received scrolling input is more than the predetermined acceleration, the preloading of the second set of the plurality of objects includes preloading and storing a second set of parent objects different from the first set of parent objects and concurrently preloading and storing one or more child objects associated with at least one parent object of the second set of parent objects.

2. The computer-implemented method of claim 1, wherein:
    the user scrolls through the displayed parent objects by swiping across the screen of the user device; and
    the acceleration of the user scrolling is determined based on a speed the user swipes across the screen of the user device.

3. The computer-implemented method of claim 1, wherein when the user scrolls through the displayed parent objects at the acceleration that is greater than the predetermined acceleration, the second set of the plurality of objects in the hierarchy are further, in position, from the displayed parent objects currently displayed on the screen of the user device.

4. The computer-implemented method of claim 1, wherein when the user scrolls through the displayed parent objects at the acceleration that is less than or equal to the predetermined acceleration, the second set of the plurality of objects in the hierarchy are closer, in position, to the displayed parent objects currently displayed on the screen of the user device.

5. The computer-implemented method of claim 1, wherein preloading the child objects associated with at least one of the loaded parent objects comprises downloading the child objects from a remote device to the user device.

6. The computer-implemented method of claim 1, wherein preloading the child objects associated with at least one of the loaded parent objects comprises rendering the child objects for display.

7. The computer-implemented method of claim 1, wherein each parent object is a photo album and each child object is a photo belonging to a specific photo album.

8. The computer-implemented method of claim 1, wherein each parent object is a section of a digital book and each child object is a page belonging to a specific section.

9. One or more computer-readable non-transitory storage media embodying software that is operable when executed to:
    load, into a memory of a user device, at least a first set of a plurality of objects in a hierarchy upon opening of the first set of the objects, the hierarchy having one or more layers and each layer having at least one of the objects,
        wherein the loaded objects comprise a first set of parent objects and, for at least one of the parent objects, a set of child objects associated with the parent object in the hierarchy,
        wherein the first set of parent objects comprises a table of contents section that comprises a plurality of thumbnails, and
        wherein the table of contents section and the corresponding thumbnails are loaded into the memory of the user device;
    display a subset of the loaded objects on a screen of the user device, the displayed objects comprising:
        at least one parent object of the first set of parent objects, wherein the loaded parent objects are successively presented in a sequence when scrolling input is received with respect to the displayed parent objects; and
        one or more child objects, each of the displayed child objects being associated with one of the displayed parent objects; and
    in response to receiving the scrolling input with respect to the displayed parent objects, preloading a second set of a plurality of objects in the hierarchy different from the first set of the plurality of objects to be displayed after the displayed subset of loaded objects based on the acceleration of the received scrolling input through the sequence of parent objects such that
        when the acceleration of the received scrolling input is less than or equal to a predetermined acceleration, the preloading of the second set of the plurality of objects includes preloading and storing one or more child objects associated with at least one of the loaded parent objects; and when the acceleration of the received scrolling input is more than the predetermined acceleration, the preloading of the second set of the plurality of objects includes preloading and storing a second set of parent objects different from the first set of parent objects and concurrently preloading and storing one or more child objects associated with at least one parent object of the second set of parent objects.

10. The media of claim 9, wherein:
the user scrolls through the displayed parent objects by swiping across the screen of the user device; and
the acceleration of the user scrolling is determined based on a speed the user swipes across the screen of the user device.

11. The media of claim 9, wherein when the user scrolls through the displayed parent objects at the acceleration that is greater than the predetermined acceleration, the second set of the plurality of objects in the hierarchy are further, in position, from the displayed parent objects currently displayed on the screen of the user device.

12. The media of claim 9, wherein when the user scrolls through the displayed parent objects at the acceleration that is less than or equal to the predetermined acceleration, the second set of the plurality of objects in the hierarchy are closer, in position, to the displayed parent objects currently displayed on the screen of the user device.

13. The media of claim 9, wherein preload the child objects associated with at least one of the loaded parent objects comprises download the child objects from a remote device to the user device.

14. The media of claim 9, wherein preload the child objects associated with at least one of the loaded parent objects comprises render the child objects for display.

15. A system comprising:
one or more processors; and
a memory coupled to the processors comprising instructions executable by the processors, the processors operable when executing the instructions to:
load, into a memory of a user device, at least a first set of a plurality of objects in a hierarchy upon opening of the first set of the objects, the hierarchy having one or more layers and each layer having at least one of the objects,
wherein the loaded objects comprise a first set of parent objects and, for at least one of the parent objects, a set of child objects associated with the parent object in the hierarchy,
wherein the first set of parent objects comprises a table of contents section that comprises a plurality of thumbnails, and
wherein the table of contents section and the corresponding thumbnails are loaded into the memory of the user device;
display a subset of the loaded objects on a screen of the user device, the displayed objects comprising:

at least one parent object of the first set of parent objects, wherein the loaded parent objects are successively presented in a sequence when scrolling input is received with respect to the displayed parent objects; and;
one or more child objects, each of the displayed child objects being associated with one of the displayed parent objects; and
in response to receiving the scrolling input with respect to the displayed parent objects, preloading a second set of a plurality of objects in the hierarchy different from the first set of the plurality of objects to be displayed after the displayed subset of loaded objects based on the acceleration of the received scrolling input through the sequence of parent objects such that
when the acceleration of the received scrolling input is less than or equal to a predetermined acceleration, the preloading of the second set of the plurality of objects includes preloading and storing one or more child objects associated with at least one of the loaded parent objects; and
when the acceleration of the received scrolling input is more than the predetermined acceleration, the preloading of the second set of the plurality of objects includes preloading and storing a second set of parent objects different from the first set of parent objects and concurrently preloading and storing one or more child objects associated with at least one parent object of the second set of parent objects.

16. The system of claim 15, wherein:
the user scrolls through the displayed parent objects by swiping across the screen of the user device; and
the acceleration of the user scrolling is determined based on a speed the user swipes across the screen of the user device.

17. The system of claim 15, wherein when the user scrolls through the displayed parent objects at the acceleration that is greater than the predetermined acceleration, the second set of the plurality of objects in the hierarchy are further, in position, from the displayed parent objects currently displayed on the screen of the user device.

18. The system of claim 15, wherein when the user scrolls through the displayed parent objects at the acceleration that is less than or equal to the predetermined acceleration, the second set of the plurality of objects in the hierarchy are closer, in position, to the displayed parent objects currently displayed on the screen of the user device.

19. The system of claim 15, wherein preload the child objects associated with at least one of the loaded parent objects comprises download the child objects from a remote device to the user device.

20. The system of claim 15, wherein preload the child objects associated with at least one of the loaded parent objects comprises render the child objects for display.

* * * * *